(12) United States Patent
Battenfeld et al.

(10) Patent No.: US 8,882,876 B2
(45) Date of Patent: Nov. 11, 2014

(54) FIBER WEBS INCLUDING SYNTHETIC FIBERS

(75) Inventors: Juergen Battenfeld, Battenberg (DE); Eszter Nofz, Breidenbach (DE); Nicolas Clement, Littleton, MA (US)

(73) Assignee: Hollingsworth & Vose Company, East Walpole, MA (US)

(*) Notice: Subject to any disclaimer, the term of this patent is extended or adjusted under 35 U.S.C. 154(b) by 73 days.

(21) Appl. No.: 13/528,766

(22) Filed: Jun. 20, 2012

(65) Prior Publication Data

US 2013/0340398 A1   Dec. 26, 2013

(51) Int. Cl.
*B01D 39/02* (2006.01)

(52) U.S. Cl.
USPC ............. 55/527; 55/486; 55/490; 55/493; 55/498; 55/503

(58) Field of Classification Search
CPC .................... B01D 39/18; B01D 39/2017
USPC ......... 55/490, 493, 497–498, 503, 508, 527, 55/486
See application file for complete search history.

(56) References Cited

U.S. PATENT DOCUMENTS

| | | |
|---|---|---|
| 3,083,118 A | 3/1963 | Bridgeford |
| 3,290,207 A | 12/1966 | Magat et al. |
| 3,441,515 A | 4/1969 | Oshida et al. |
| 4,639,513 A | 1/1987 | Hou et al. |
| 5,196,470 A | 3/1993 | Anderson et al. |
| 5,366,832 A | 11/1994 | Hayashi et al. |
| 5,580,459 A | 12/1996 | Powers et al. |
| 5,672,399 A | 9/1997 | Kahlbaugh et al. |
| 5,725,821 A | 3/1998 | Gannon et al. |
| 5,731,080 A | 3/1998 | Cousin et al. |
| 5,785,725 A | 7/1998 | Cusick et al. |
| 5,958,320 A | 9/1999 | Pitowski et al. |
| 5,983,469 A | 11/1999 | Beaty et al. |
| 6,001,639 A | 12/1999 | Schulein et al. |
| 6,042,769 A | 3/2000 | Gannon et al. |
| 6,159,601 A | 12/2000 | Pitowski et al. |
| 6,171,684 B1 | 1/2001 | Kahlbaugh et al. |
| 6,221,487 B1 | 4/2001 | Luo et al. |
| 6,235,392 B1 | 5/2001 | Luo et al. |

(Continued)

FOREIGN PATENT DOCUMENTS

| | | |
|---|---|---|
| EP | 0 572 569 B1 | 12/1994 |
| EP | 0 898 316 A1 | 2/1999 |

(Continued)

OTHER PUBLICATIONS

International Search Report and Written Opinion for PCT/US2011/065484 mailed Apr. 20, 2012.

(Continued)

*Primary Examiner* — Jason M Greene
*Assistant Examiner* — Karla Hawkins
(74) *Attorney, Agent, or Firm* — Wolf, Greenfield & Sacks, P.C.

(57) ABSTRACT

Filter media suitable for various applications and related components, systems, and methods associated therewith are described. The filter media may include a fiber web having a mixture comprising non-fibrillated synthetic fibers and fibrillated fibers, such as lyocell. The fiber web may also include multi-component fibers (e.g., bi-component fibers). In some embodiments, glass fibers are not incorporated into the fiber web.

27 Claims, 9 Drawing Sheets

(56) References Cited

U.S. PATENT DOCUMENTS

| | | |
|---|---|---|
| 6,387,690 B1 | 5/2002 | Schulein et al. |
| 6,419,839 B1 | 7/2002 | Cox et al. |
| 6,511,930 B1 | 1/2003 | Luo et al. |
| 6,596,033 B1 | 7/2003 | Luo et al. |
| 6,660,172 B2 | 12/2003 | Koslow |
| 6,692,827 B2 | 2/2004 | Luo et al. |
| 6,706,876 B2 | 3/2004 | Luo et al. |
| 6,855,531 B2 | 2/2005 | Shulein et al. |
| 6,872,311 B2 | 3/2005 | Koslow |
| 6,939,492 B2 | 9/2005 | Jackson et al. |
| 7,008,465 B2 | 3/2006 | Graham et al. |
| 7,052,532 B1 | 5/2006 | Liu et al. |
| 7,137,510 B1 | 11/2006 | Klein et al. |
| 7,214,727 B2 | 5/2007 | Kwon et al. |
| 7,226,773 B2 | 6/2007 | Schulein et al. |
| 7,228,973 B2 * | 6/2007 | Simon .................. 210/505 |
| 7,244,497 B2 | 7/2007 | Hartmann et al. |
| 7,296,691 B2 | 11/2007 | Koslow |
| 7,314,497 B2 | 1/2008 | Kahlbaugh et al. |
| 7,390,343 B2 | 6/2008 | Tepper et al. |
| 7,445,737 B2 | 11/2008 | Sanderson et al. |
| 7,534,379 B2 | 5/2009 | Ellison et al. |
| 7,534,380 B2 | 5/2009 | Ellison et al. |
| 7,655,112 B2 | 2/2010 | Koslow |
| 7,670,678 B2 | 3/2010 | Phan |
| 8,012,312 B2 | 9/2011 | Goto et al. |
| 2002/0037407 A1 | 3/2002 | Luo et al. |
| 2002/0187701 A1 | 12/2002 | Healey |
| 2003/0054539 A1 | 3/2003 | Schulein et al. |
| 2003/0141261 A1 | 7/2003 | Koslow |
| 2003/0168401 A1 | 9/2003 | Koslow |
| 2003/0177909 A1 | 9/2003 | Koslow |
| 2004/0043243 A1 | 3/2004 | Chen et al. |
| 2004/0178142 A1 | 9/2004 | Koslow |
| 2005/0011827 A1 | 1/2005 | Koslow |
| 2005/0070003 A1 | 3/2005 | Schulein et al. |
| 2005/0142973 A1 | 6/2005 | Bletsos et al. |
| 2005/0216075 A1 | 9/2005 | Wang et al. |
| 2006/0102871 A1 | 5/2006 | Wang et al. |
| 2006/0134411 A1 | 6/2006 | Mackey et al. |
| 2006/0249705 A1 | 11/2006 | Wang et al. |
| 2007/0017075 A1 | 1/2007 | Nguyen |
| 2007/0017076 A1 | 1/2007 | Nguyen et al. |
| 2007/0039300 A1 | 2/2007 | Kahlbaugh et al. |
| 2007/0154510 A1 | 7/2007 | Wilcher et al. |
| 2007/0232178 A1 | 10/2007 | Polat et al. |
| 2007/0232179 A1 | 10/2007 | Polat et al. |
| 2007/0251624 A1 | 11/2007 | Han et al. |
| 2007/0266503 A1 | 11/2007 | Schmidt-Forst et al. |
| 2008/0020205 A1 | 1/2008 | Fink et al. |
| 2008/0131471 A1 | 6/2008 | Kolbe et al. |
| 2008/0149561 A1 | 6/2008 | Chu et al. |
| 2008/0154225 A1 | 6/2008 | Phan |
| 2008/0241536 A1 | 10/2008 | Luo et al. |
| 2009/0004473 A1 | 1/2009 | Luo |
| 2009/0022960 A1 | 1/2009 | Suer et al. |
| 2009/0022983 A1 | 1/2009 | Cabell et al. |
| 2009/0025894 A1 | 1/2009 | Barnholtz et al. |
| 2009/0042475 A1 | 2/2009 | Pourdeyhimi |
| 2009/0050578 A1 | 2/2009 | Israel et al. |
| 2009/0078640 A1 | 3/2009 | Chu et al. |
| 2009/0087475 A1 | 4/2009 | Sheehan |
| 2009/0123525 A1 | 5/2009 | Bedard |
| 2009/0165969 A1 | 7/2009 | Luo |
| 2009/0218056 A1 | 9/2009 | Manifold et al. |
| 2009/0218057 A1 | 9/2009 | Manifold et al. |
| 2009/0218058 A1 | 9/2009 | Manifold et al. |
| 2009/0218063 A1 | 9/2009 | Manifold et al. |
| 2009/0220731 A1 | 9/2009 | Manifold et al. |
| 2009/0220741 A1 | 9/2009 | Manifold et al. |
| 2009/0220769 A1 | 9/2009 | Manifold et al. |
| 2009/0227975 A1 | 9/2009 | Dougherty et al. |
| 2009/0232920 A1 | 9/2009 | Lozano et al. |
| 2009/0246447 A1 | 10/2009 | Luo |
| 2009/0269429 A1 | 10/2009 | Lozano et al. |
| 2009/0324926 A1 | 12/2009 | Luo |
| 2010/0065236 A1 | 3/2010 | Henriksson et al. |
| 2010/0187171 A1 * | 7/2010 | Gupta .................. 210/491 |
| 2010/0252510 A1 | 10/2010 | Godsay et al. |
| 2010/0314333 A1 * | 12/2010 | Witsch et al. .................. 210/767 |
| 2010/0319543 A1 | 12/2010 | Witsch et al. |
| 2010/0326902 A1 * | 12/2010 | Midkiff et al. .................. 210/490 |
| 2011/0114276 A1 | 5/2011 | Cordova et al. |
| 2012/0085567 A1 | 4/2012 | Lintz et al. |
| 2012/0097032 A1 | 4/2012 | Witsch et al. |
| 2012/0132381 A1 | 5/2012 | Hentze et al. |
| 2012/0152859 A1 | 6/2012 | Battenfeld et al. |
| 2013/0341290 A1 | 12/2013 | Yu et al. |

FOREIGN PATENT DOCUMENTS

| | | |
|---|---|---|
| EP | 1 493 753 A1 | 1/2005 |
| EP | 0 815 209 B1 | 1/2006 |
| EP | 1 849 896 A1 | 10/2007 |
| WO | WO 96/29397 A1 | 9/1996 |
| WO | WO 97/23669 A1 | 7/1997 |
| WO | WO 98/07911 A1 | 2/1998 |
| WO | WO 99/45875 A1 | 9/1999 |
| WO | WO 00/66820 A1 | 11/2000 |
| WO | WO 01/86043 A1 | 11/2001 |
| WO | WO 03/033806 A2 | 4/2003 |
| WO | WO 03/063996 A2 | 8/2003 |
| WO | WO 03/064006 A1 | 8/2003 |
| WO | WO 2004/026958 A1 | 4/2004 |
| WO | WO 2005/001174 A1 | 1/2005 |
| WO | WO 2005/009589 A1 | 2/2005 |
| WO | WO 2005/016208 A1 | 2/2005 |
| WO | WO 2005/017247 A2 | 2/2005 |
| WO | WO 2005/040495 A1 | 5/2005 |
| WO | WO 2005/072950 A1 | 8/2005 |
| WO | WO 2006/007020 A1 | 1/2006 |
| WO | WO 2006/083668 A2 | 8/2006 |
| WO | WO 2006/083796 A2 | 8/2006 |
| WO | WO 2007/089230 A2 | 8/2007 |
| WO | WO 2007/112916 A1 | 10/2007 |
| WO | WO 2007/113772 A1 | 10/2007 |
| WO | WO 2007/120342 A2 | 10/2007 |
| WO | WO 2009/006206 A1 | 1/2009 |
| WO | WO 2009/006207 A1 | 1/2009 |
| WO | WO 2009/059342 A1 | 5/2009 |
| WO | WO 2009/061575 A1 | 5/2009 |
| WO | WO 2009/088635 A2 | 7/2009 |
| WO | WO 2009/107024 A1 | 9/2009 |
| WO | WO 2009/117356 A1 | 9/2009 |
| WO | WO 2009/117361 A1 | 9/2009 |
| WO | WO 2009/117363 A1 | 9/2009 |
| WO | WO 2009/123899 A2 | 10/2009 |
| WO | WO 2010/008621 A1 | 1/2010 |
| WO | WO 2012/124652 A1 | 9/2012 |
| WO | 2013/132161 A2 | 9/2013 |

OTHER PUBLICATIONS

Boldizar et al., Prehydrolyzed cellulose as reinforcing filler for thermoplastics. Int J Polymeric Mat. 1987;4:229-62.

Burger et al., Nanofibrous materials and their applications. Annu. Rev. Mater. Res. 2006;36:333-68.

Chinga-Carrasco et al., Cellulose fibres, nanofibrils and microfibrils: the morphological sequence of MFC components from a plant physiology and fibre technology point of view. Nanoscale Res Lett. 2011;6:417-423.

Garcia De Rodriguez et al., Sisal cellulose whiskers reinforced polyvinyl acetate nanocomposites. Cellulose. 2006;13:261-70.

Henriksson et al., Cellulose nanopaper structures of high toughness. Biomacromolecules. 2008;9:1579-85.

Henriksson et al., Structure and properties of cellulose nanocomposite films containing melamine formaldehyde. J. Appl. Sci. 2007;106:2817-24.

Nakagaito et al., Novel high-strength bicomposites based on microfibrillated cellulose having nano-order unit web-like network structure. Appl. Phys. A. 2005;80:155-9.

International Preliminary Report on Patentability for PCT/US2011/065484 mailed Jun. 27, 2013.

(56) References Cited

OTHER PUBLICATIONS

International Search Report and Written Opinion for PCT/US2013/046736 mailed Nov. 12, 2013.
International Search Report and Written Opinion for PCT/US2013/046752 mailed Nov. 5, 2013.
International Search Report and Written Opinion for PCT/US2013/074261 mailed Apr. 14, 2014.
Ragauskas et al., A nano perspective of cellulose. School of Chemistry and Biochemistry Institute of Paper Science and Technology Georgia Institute of Technology. Feb. 2007. PowerPoint. 24 pages.

* cited by examiner

FIBER WEBS INCLUDING SYNTHETIC FIBERS

FIELD OF INVENTION

Aspects described herein relate generally to fibers webs that include synthetic fibers and can be used in filter media.

BACKGROUND

Filter media can be used to remove contamination in a variety of applications. In general, filter media include one or more fiber webs. The fiber web provides a porous structure that permits fluid (e.g., hydraulic fluid, fuel, lube, air) to flow through the web. Contaminant particles contained within the fluid may be trapped on the fiber web. Fiber web characteristics (e.g., fiber dimensions, fiber composition, basis weight, amongst others) affect mechanical properties (e.g., elongation, strength, amongst others) and filtration performance (e.g., dust holding capacity, beta efficiency, amongst others).

Certain filter media include webs that comprise glass fibers. While often having desirable filtration performance, glass fiber webs may exhibit limited strength and brittle characteristics which can lead to difficulties in handling and further processing (e.g., pleating). The presence of glass fibers in filter media may also give rise to environmental concerns.

In some applications, it would be desirable to limit the amount of glass fiber in a fiber web, while still achieving a desirable balance of properties including high flexibility and strength and high dust holding capacity, amongst others.

SUMMARY

Fibers webs that include synthetic fibers and can be used in filter media are described herein.

In an embodiment, a fiber web is provided. The fiber web comprises a plurality of non-fibrillated synthetic fibers and a plurality of fibrillated fibers, wherein the fiber web comprises between about 30 weight % and about 95 weight % of the non-fibrillated synthetic fibers and has a dust holding capacity of greater than about 30 g/m$^2$.

In another embodiment, a filter media is provided. The filter media comprises a first layer having a first plurality of non-fibrillated synthetic fibers and a first plurality of fibrillated fibers, wherein the first layer comprises between about 30 weight % and about 95 weight % the first plurality of non-fibrillated synthetic fibers; and a second layer having a second plurality of non-fibrillated synthetic fibers and a second plurality of fibrillated fibers, wherein the second layer comprises between about 30 weight % and about 95 weight % the second plurality of non-fibrillated synthetic fibers; wherein the filter media has a dust holding capacity of greater than about 30 g/m$^2$.

In a further embodiment, a fiber web is provided. The fiber web comprises a plurality of non-fibrillated synthetic fibers and a plurality of fibrillated fibers, wherein the plurality of fibrillated fibers have a Canadian Standard Freeness level of fibrillation of between about 50 mL and about 850 mL and the fiber web comprises between about 30 weight % and about 95 weight % of the non-fibrillated synthetic fibers.

In yet another embodiment, a fiber web is provided. The fiber web comprises a plurality of non-fibrillated synthetic fibers, a plurality of fibrillated fibers, and optionally a plurality of glass fibers, wherein the fiber web comprises between about 10 weight % and about 95 weight % of the non-fibrillated synthetic fibers, between about 5 weight % and about 60 weight % of the fibrillated fibers, and between 0% and about 5% of the glass fibers.

In another embodiment, a fiber web is provided. The fiber web comprises a plurality of multi-component fibers and optionally a plurality of glass fibers, wherein the plurality of multi-component fibers comprises between about 1% and about 20% by weight of the fiber web and the plurality of glass fibers comprises between 0% and about 5% of the fiber web, and wherein the fiber web media has a dust holding capacity of greater than about 30 g/m$^2$.

In yet a further embodiment, a method of manufacturing a fiber web is provided. The method comprises blending a plurality of fibrillated fibers and non-fibrillated synthetic fibers to form a mixture, wherein the plurality of fibrillated fibers have a Canadian Standard Freeness level of fibrillation of between about 50 mL and about 850 mL and the non-fibrillated synthetic fibers comprises between about 30 weight % and about 95 weight % of the fiber web; and adding a binder resin to the mixture of fibrillated fibers and non-fibrillated synthetic fibers.

The foregoing is a non-limiting summary of the invention, which is defined by the attached claims. Other aspects, embodiments, features and advantages will become apparent from the following description. Each reference incorporated herein by reference is incorporated in its entirety. In cases of conflict or inconsistency between an incorporated reference and the present specification, the present specification will control.

BRIEF DESCRIPTION OF THE DRAWINGS

The accompanying drawings are not intended to be drawn to scale. For purposes of clarity, not every component may be labeled in every drawing. In the drawings.

DETAILED DESCRIPTION

Figure 1:
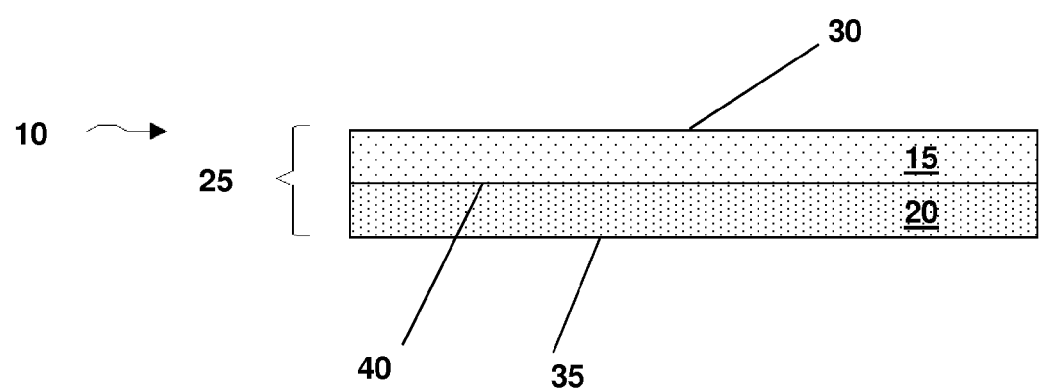
FIG. 1 is a schematic diagram showing a filter media in accordance with one or more embodiments.

Fiber webs which are used in filter media are described herein. As described further below, the fiber webs generally include a mixture of fibrillated fibers and non-fibrillated synthetic fibers, amongst other optional components (e.g., binder resin). In some embodiments, the fiber webs include limited amounts of, or no, glass fiber. The respective characteristics and amounts of the fibrillated and non-fibrillated fibers are selected to impart desirable properties including mechanical properties (e.g., elongation and strength) and filtration properties (e.g., dust holding capacity and efficiency), amongst other benefits. Filter media formed of the webs may be particularly well-suited for applications that involve filtering hydraulic fluid, though the media may also be used in other applications, such as for fuel applications, lube application, or air applications, amongst others. In some embodiments, the fiber webs described herein may be used as a pre-filter layer which is combined with a main filter layer (i.e., the layer that provides most of the filtration performance), though other uses and arrangements are possible.

As noted above, the fiber webs include fibrillated fibers (e.g., lyocell fibers). As known to those of ordinary skill in the art, a fibrillated fiber includes a parent fiber that branches into smaller diameter fibrils which can, in some instances, branch further out into even smaller diameter fibrils with further branching also being possible. The branched nature of the fibrils leads to a fiber web having a high surface area and can increase the number of contact points between the fibrillated fibers and other fibers in the web. Such an increase in points of contact between the fibrillated fibers and other fibers and/or components of the web may contribute to enhancing mechanical properties (e.g., flexibility, strength) and/or filtration performance properties of the fiber web.

A fibrillated fiber may be formed of any suitable materials such as synthetic materials (e.g., synthetic polymers such as polyester, polyamide, polyaramid, polyimide, polyethylene, polypropylene, polyether ether ketone, polyethylene terephthalate, polyolefin, nylon, acrylics, regenerated cellulose (e.g., lyocell, rayon), poly p-phenylene-2,6-bezobisoxazole (PBO), and natural materials (e.g., natural polymers such as cellulose (e.g., non-regenerated cellulose)). In some embodiments, organic polymer fibers are used.

In some embodiments, fibrillated fibers may be synthetic fibers. Synthetic fibers as used herein, are non-naturally occurring fibers formed of polymeric material. Fibrillated fibers may also be non-synthetic fibers, for example, cellulose fibers that are naturally occurring. It can be appreciated that fibrillated fibers may include any suitable combination of synthetic and/or non-synthetic fibers. In general, the fibrillated fibers may include any suitable level of fibrillation. The level of fibrillation relates to the extent of branching in the fiber. The level of fibrillation may be measured according to any number of suitable methods.

For example, the level of fibrillation of the fibrillated fibers can be measured according to a Canadian Standard Freeness (CSF) test, specified by TAPPI test method T 227 om 09 Freeness of pulp. The test can provide an average CSF value. In some embodiments, the average CSF value of the fibrillated fibers may be 0 mL or greater, may be about 10 mL or greater, may be about 20 mL or greater, may be about 35 mL or greater, may be about 45 mL or greater; in some embodiments, about 50 mL or greater; in some embodiments, about 75 mL or greater; in some embodiments, about 100 mL or greater; in some embodiments, about 150 mL or greater; in some embodiments, about 200 mL or greater; in some embodiments, about 250 mL or greater; in some embodiments, about 300 mL or greater; in some embodiments, about 350 mL or greater; in some embodiments, about 400 mL or greater; in some embodiments, about 500 mL or greater; and, in some embodiments, about 600 mL or greater. In some embodiments, the average CSF value is about 1000 mL or less; in some embodiments, about 850 mL or less; in some embodiments, about 600 mL or less; in some embodiments, about 500 mL or less; in some embodiments, about 400 mL or less; in some embodiments, about 350 mL or less; in some embodiments, about 300 mL or less; in some embodiments, about 250 mL or less; in some embodiments, about 200 mL or less; in some embodiments, about 150 mL or less; in some embodiments, about 100 mL or less; in some embodiments, about 50 mL or less; and, in some embodiments, about 45 mL or less. It should be understood that the average CSF values may be between any of the above-noted lower limits and upper limits. For example, the average CSF value of the fibrillated fibers may be between about 45 mL and about 1000 mL, between about 50 mL and about 850 mL, between about 75 mL and about 850 mL, between about 100 mL and about 1000 mL, between about 150 mL and about 600 mL, between about 100 mL and about 300 mL, between about 150 mL and about 300 mL, between about 100 mL and about 350 mL, between about 150 mL and about 350 mL, between about 100 mL and about 400 mL, between about 150 mL and about 400 mL, between about 100 mL and about 450 mL, between about 150 mL and about 450 mL, between about 200 mL and about 500 mL, between about 200 mL and about 400 mL, between about 200 mL and about 300 mL, between about 250 mL and about 300 mL, and the like.

In some embodiments, the level of fibrillation of the fibrillated fibers can be measured according to a Schopper Riegler (SR) test. In some embodiments, the average SR value of the fibrillated fibers may be greater than about 20° SR, greater than about 30° SR, greater than about 40° SR, greater than about 50° SR, or greater than about 60° SR. In some embodiments, the average SR value of the fibrillated fibers may be less than about 80° SR, less than about 70° SR, less than about 60° SR, less than about 50° SR, or less than about 40° SR. It can be appreciated that the average SR values may be between any of the above-noted lower limits and upper limits. For example, the average SR value of the fibrillated fibers may be between about 20° SR and about 70° SR, between about 20° SR and about 60° SR, or between about 30° SR and about 50° SR, between about 32° SR and about 52° SR, or between about 40° SR and about 50° SR.

It should be understood that, in certain embodiments, the fibers may have fibrillation levels outside the above-noted ranges.

In certain preferred embodiments, the fibrillated fibers are formed of lyocell. Lyocell fibers are known to those of skill in the art as a type of synthetic fiber and may be produced from regenerated cellulose by solvent spinning.

In certain embodiments, the fibrillated fibers are formed of rayon. Rayon fibers are also produced from regenerated cellulose and may be produced using an acetate method, a cuprammonium method, or a viscose process. In these methods, the cellulose or cellulose solution may be spun to form fibers.

Fibers may be fibrillated through any appropriate fibrillation refinement process. In some embodiments, fibers (e.g., lyocell fibers) are fibrillated using a disc refiner, a stock beater or any other suitable fibrillating equipment.

It should be understood that, in certain embodiments, the fibrillated fibers may have compositions other than those described above. For example, suitable compositions may include acrylic, liquid crystalline polymers, polyoxazole (e.g., poly(p-phenylene-2,6-benzobisoxazole), aramid, paramid, cellulose wood, cellulose non-wood, cotton, polyethylene, polyolefin and olefin, amongst others.

In general, the fibrillated fibers may have any suitable dimensions (e.g., dimensions measured via a microscope).

As noted above, fibrillated fibers include parent fibers and fibrils. The parent fibers may have an average diameter of less than about 75 microns; in some embodiments, less than about 60 microns; in some embodiments, less than about 50 microns; in some embodiments, less than about 40 microns; in some embodiments, less than about 30 microns; in some embodiments, less than about 20 microns; in some embodiments, less than about 15 microns; and in some embodiments, less than about 10 microns. The fibrils may have an average diameter of less than about 15 microns; in some embodiments, less than about 10 microns; in some embodiments, less than about 6 microns; in some embodiments, less than about 4 microns; in some embodiments, less than about 3 microns; in some embodiments, less than about 1 micron; and in some embodiments, less than about 0.5 microns. For example, the fibrils may have a diameter of between about 0.1 micron and about 15 microns, between about 0.1 micron and about 10 microns, between about 1 micron and about 10 microns, between about 3 microns and about 10 microns, between about 3 microns and about 6 microns, between about 0.1 micron and about 6 microns, between about 0.1 micron and about 2 microns, between about 0.1 micron and about 1.5 microns, or between about 0.3 microns and about 0.7 microns.

The fibrillated fibers described may have an average length of greater than about 1 mm, greater than about 2 mm, greater than about 3 mm, greater than about 4 mm, greater than about 5 mm, greater than about 6 mm, greater than about 10 mm, or greater than about 15 mm. The fibrillated fibers may have an average length of less than about 15 mm, less than about 10 mm, less than about 6 mm, less than about 5 mm, less than about 4 mm, less than about 3 mm, less than about 2 mm, or less than about 1 mm. It should be understood that the average length of the fibrillated fibers may be between any of the above-noted lower limits and upper limits. For example, the average length of the fibrillated fibers may be between about 0.1 and about 15 mm, between about 0.2 and about 12 mm, between about 0.5 and about 10 mm, between about 1 and about 10 mm, between about 1 and about 5 mm, between about 2 mm and about 4 mm, between about 0.1 and about 2 mm, between about 0.1 and about 1.2 mm, or between about 0.8 mm and about 1.1 mm. The average length of the fibrillated fibers refers to the average length of parent fibers from one end to an opposite end of the parent fibers. In some embodiments, the maximum average length of the fibrillated fibers fall within the above-noted ranges. The maximum average length refers to the average of the maximum dimension along one axis of the fibrillated fibers (including parent fibers and fibrils).

The above-noted dimensions may be, for example, when the fibrillated fibers are lyocell or the fibrillated fibers are a material other than lyocell. It should be understood that, in certain embodiments, the fibers and fibrils may have dimensions outside the above-noted ranges.

In general, the fiber web may include any suitable weight percentage of fibrillated fibers to achieve the desired balance of properties. In some embodiments, the weight percentage of the fibrillated fibers in the fiber web is about 1 weight % or greater, about 2.5 weight % or greater, about 5 weight % or greater, about 10 weight % or greater, or about 15 weight % or greater. In some embodiments, the weight percentage of the fibrillated fibers in the web is about 60 weight % or less, about 50 weight % or less, about 30 weight % or less, or about 21 weight % or less. It should be understood that the weight percentage of fibrillated fibers in the fiber web may be between any of the above-noted lower limits and upper limits. For example, the weight percentage may be between about 1 weight % and about 60 weight %; in some embodiments, between about 2.5 weight % and about 60 weight %; in some embodiments, between about 5 weight % and about 60 weight %; in some embodiments, between about 10 weight % and about 50 weight %; in some embodiments, between about 10 weight % and about 40 weight %; in some embodiments, between about 10 weight % and about 30 weight %; in some embodiments, between about 10 weight % and about 25 weight %; and, in some embodiments, between about 12% by weight and about 21%, and the like.

In some embodiments, fiber webs having an amount of fibrillated fibers that is greater than that of other fiber webs may exhibit a comparatively greater degree of flexibility and strength, for example, an increased elongation, tensile strength and/or burst strength than the other fiber webs.

In some cases, it may be advantageous for the fibrillated fibers to be aligned in the machine direction of the web (i.e., when a fiber's length extends substantially in the machine direction) and/or in the cross-machine direction of the web (i.e., when a fiber's length extends substantially in the cross-machine direction). It should be understood that the terms "machine direction" and "cross-machine" direction have their usual meanings in the art. That is, the machine direction refers to the direction in which the fiber web moves along the processing machine during processing and the cross-machine direction refers to a direction perpendicular to the machine direction.

As noted above, the fiber webs also include non-fibrillated synthetic fibers. That is, synthetic fibers that are not fibrillated. Synthetic fibers, as noted above, are non-naturally occurring fibers formed of polymeric materials. Non-fibrillated synthetic fibers include any suitable type of synthetic polymer including thermoplastic polymers. Examples of suitable non-fibrillated synthetic fibers include polyester, polyamide, polyaramid, polyimide, polyethylene, polypropylene, polyether ether ketone, polyethylene terephthalate, polyolefin, nylon, and combinations thereof. It should be understood that other types of non-fibrillated synthetic fiber types may also be used.

The fiber web may include a suitable percentage of non-fibrillated synthetic fibers. In some embodiments, the weight percentage of the non-fibrillated fibers in the fiber web is about 10 weight % or greater, about 20 weight % or greater, about 30 weight % or greater, about 40 weight % or greater, about 50 weight % or greater, about 60 weight % or greater, about 70 weight % or greater, or about 80 weight % or greater. In some embodiments, the weight percentage of the non-fibrillated fibers in the fiber web is about 95 weight % or less, about 90 weight % or less, about 80 weight % or less, about 70 weight % or less, about 60 weight % or less, or about 50 weight % or less. It should be understood that the weight percentage of non-fibrillated fibers in the fiber web may be between any of the above-noted lower limits and upper limits. For example, the weight percentage may be between about 10 weight % and about 95 weight %, between about 20 weight % and about 95 weight %, between about 30 weight % and about 95 weight %, between about 30 weight % and about 90 weight %, between about 40 weight % and about 80 weight %, and the like. It can be appreciated that it may also be possible for non-fibrillated synthetic fibers to be incorporated within the fiber web outside of the ranges disclosed.

In some embodiments, the fiber web may include multiple types of non-fibrillated synthetic fibers.

In general, non-fibrillated synthetic fibers may have any suitable dimensions. For instance, non-fibrillated synthetic fibers may have an average diameter of between about 2 microns and about 20 microns, between about 3 microns and about 15 microns, between about 3 microns and about 10 microns, between about 4 microns and about 7 microns, or between about 3 microns and about 7 microns. In some embodiments, fiber webs having non-fibrillated synthetic fibers with a greater average diameter may exhibit a higher degree of air permeability than fiber webs having non-fibrillated synthetic fibers with a comparatively smaller average diameter. The non-fibrillated synthetic fibers described may have an average length of between about 3 mm and about 12 mm, between about 4 mm and about 6 mm, between about 3 mm and about 10 mm, or between about 5 mm and about 7 mm. In some embodiments, fiber webs having non-fibrillated synthetic fibers with a greater average length may exhibit a higher degree of tensile strength than fiber webs having non-fibrillated synthetic fibers with a comparatively smaller average length. It should be understood that, in certain embodiments, non-fibrillated synthetic fibers may have dimensions outside the above-noted ranges.

In some embodiments, non-fibrillated synthetic fibers may be staple fibers which may be synthetic fibers that are cut to a suitable average length and are appropriate for incorporation into a wet-laid or dry-laid process for forming a filter media. In some cases, groups of staple fibers may be cut to have a particular length with only slight variations in length between individual fibers.

In some embodiments, the non-fibrillated synthetic fibers may be binder fibers. Non-fibrillated synthetic fibers may be mono-component (i.e., having a single composition) or multi-component (i.e., having multiple compositions such as bi-component fiber).

In some embodiments, the fiber web may include a suitable percentage of mono-component fibers and/or multi-component fibers. In some embodiments, all of the non-fibrillated synthetic fibers are mono-component fibers. In some embodiments, at least a portion of the non-fibrillated synthetic fibers are multi-component fibers.

An example of a multi-component fiber is a bi-component fiber which includes a first material and a second material that is different from the first material. The different components of a multi-component fiber may exhibit a variety of spatial arrangements. For example, multi-component fibers may be arranged in a core-sheath configuration (e.g., a first material may be a sheath material that surrounds a second material which is a core material), a side by side configuration (e.g., a first material may be arranged adjacent to a second material), a segmented pie arrangement (e.g., different materials may be arranged adjacent to one another in a wedged configuration), a tri-lobal arrangement (e.g., a tip of a lobe may have a material different from the lobe) and an arrangement of localized regions of one component in a different component (e.g., "islands in sea").

In some embodiments, for a core-sheath configuration, a multi-component fiber, such as a bi-component fiber, may include a sheath of a first material that surrounds a core comprising a second material. In such an arrangement, for some embodiments, the melting point of the first material may be lower than the melting point of the second material. Accordingly, at a suitable step during manufacture of a fiber web (e.g., drying), the first material comprising the sheath may be melted (e.g., may exhibit a phase change) while the second material comprising the core remains unaltered (e.g., may exhibit no phase change). For instance, an outer sheath portion of a multi-component fiber may have a melting temperature between about 50° C. and about 200° C. (e.g., 180° C.) and an inner core of the multi-component fiber may have a melting temperature above 200° C. As a result, when the fiber is subjected to a temperature during drying, e.g., at 180° C., then the outer sheath of the fiber may melt while the core of the fiber does not melt.

The fiber web includes a suitable percentage of multi-component fibers, when present. For example, the weight percentage of multi-component fibers in the fiber web may be about 20 weight % or less, about 15 weight % or less, about 10 weight % or less, about 5 weight % or less, about 4 weight % or less, about 3 weight % or less, about 2 weight % or less, or about 1 weight % or less. The weight percentage of multi-component fibers in the web may be about 1 weight % or more, about 2 weight % or more, about 3 weight % or more, about 4 weight % or more, about 5 weight % or more, or about 10 weight % or more. It should be understood that the weight percentage of the multi-component fibers in the fiber web may be between any of the above-noted lower limits and upper limits. For example, the weight percentage of multi-component fibers in the fiber web may be between about 1 weight % and about 20 weight %, between about 2 weight % and about 10 weight %, between about 2 weight % and about 5 weight %, between about 3 weight % and about 5 weight %, between about 2 weight % and about 4 weight %, and the like.

It can be appreciated that it may also be possible for multi-component fibers to be incorporated within the fiber web outside of the ranges disclosed. In some cases, fiber webs having a greater amount of multi-component fibers (e.g., bi-component fibers) than other fiber webs may exhibit a comparatively greater degree of strength and flexibility, such as elongation, tensile strength and/or burst strength.

The fiber web may include limited amounts of, if any, glass fibers. For example, the weight percentage of glass fiber in the fiber web can be between 0 weight % and about 10 weight %, between 0 weight % and about 5 weight %, between 0 weight % and about 4 weight %, between 0 weight % and about 3% weight %, between 0 weight % and about 2 weight %, or between 0 weight % and about 1 weight %. When the fiber web includes less than 1 weight % of glass fiber, it is considered that the fiber web is substantially free of glass fiber.

In some cases, a fiber web having limited amounts of, if any, glass fibers when used with various machine or engine parts may result in a marked decrease in abrasion and wear as compared to a fiber web having substantially more glass fibers incorporated therein. Accordingly, using fiber webs that include little to no glass fibers therein may alleviate the necessity of having a protective scrim that may be otherwise be installed downstream from the filter media.

In some embodiments, the fiber web may include a binder resin. The binder resin is not in fiber form and is to be distinguished from binder fiber (e.g., multi-component fiber) described above. In general, the binder resin may have any suitable composition. For example, the binder resin may comprise a thermoplastic (e.g., acrylic, polyvinylacetate, polyester, polyamide), a thermoset (e.g., epoxy, phenolic resin), or a combination thereof.

For example, the weight percentage of binder resin in the fiber web may be about 10 weight % or less, about 6 weight % or less, about 5 weight % or less, or about 1 weight % or less.

As described further below, the binder resin may be added to the fibers in any suitable manner including, for example, in the wet fiber web state. In some embodiments, the binder coats the fibers and is used to adhere fibers to each other to facilitate adhesion between the fibers. Any suitable method and equipment may be used to coat the fibers, for example, using curtain coating, gravure coating, melt coating, dip coating, knife roll coating, or spin coating, amongst others. In some embodiments, the binder is precipitated when added to the fiber blend. When appropriate, any suitable precipitating agent (e.g., Epichlorhydrin, fluorocarbon) may be provided to the fibers, for example, by injection into the blend. In some embodiments, upon addition to the fiber blend, the binder resin is added in a manner such that the fiber web is impregnated with the binder resin (e.g., the binder resin permeates throughout the fiber web). In some embodiments, binder resin is added to the fiber blend while in a dry state, for example, by spraying or saturation impregnation, or any of the above methods.

It should be understood that the fiber web may, or may not, include other components in addition to those described above. Typically, any additional components, are present in limited amounts, e.g., less than 5% by weight. For example, in some embodiments, the fiber web may include polyvinyl alcohol (PVA) fibers (e.g., Kuralon), surfactants, coupling agents, crosslinking agents, and/or conductive additives, amongst others.

The fiber web described herein may be incorporated into a filter media that has a single layer (e.g., fiber web), or multiple layers (e.g., multiple fiber webs). In some embodiments of filter media involving multiple layers, a clear demarcation of layers may not always be apparent, as described in more detail below. An example of a filter media is shown in FIG. 1. As shown illustratively in FIG. 1, a filter media 10 includes a first layer 15 and a second layer 20 having a combined thickness 25. Optionally, the filter media may include additional layers (not shown).

The first layer may be positioned upstream or downstream of the second layer in a filter element. In some embodiments, one or more of the layers of the filter media are fiber webs, such as those described above.

In some embodiments, filter media 10 includes a clear demarcation between the first and second layers. For example, the filter media may include an interface 40 between the two layers that is distinct. In some such embodiments, the first and second layers may be formed separately, and combined by any suitable method such as lamination, collation, or by use of adhesives. The first and second layers may be formed using different processes, or the same process. For example, each of the first and second layers may be independently formed by a wet laid process, a dry laid process, a spinning process, a meltblown process, or any other suitable process.

In other embodiments, filter media 10 does not include a clear demarcation between the first and second layers. For example, a distinct interface between the two layers may not be apparent. In some cases, the layers forming a filter media may be indistinguishable from one another across the thickness of the filter media. The first and second layers may be formed by the same process (e.g., a wet laid process, a dry laid process, a spinning process, a meltblown process, or any other suitable process) or by different processes. In some instances, the first and second layers may be formed simultaneously.

Regardless of whether a clear demarcation between first and second layers is present, in some embodiments, filter media 10 includes a gradient (i.e., a change) in one or more properties such as fiber diameter, fiber type, fiber composition, fiber length, level of fibrillation, fiber surface chemistry, particle size, particle surface area, particle composition, pore size, material density, basis weight, solidity, a proportion of a component (e.g., a binder, resin, crosslinker), stiffness, tensile strength, wicking ability, hydrophilicity/hydrophobicity, and conductivity across a portion, or all of, the thickness of the filter media. The filter media may optionally include a gradient in one or more performance characteristics such as efficiency, dust holding capacity, pressure drop, air permeability, and porosity across the thickness of the filter media. A gradient in one or more such properties may be present in the filter media between a top surface 30 and a bottom surface 35 of the filter media.

Different types and configurations of gradients are possible within a filter media. In some embodiments, a gradient in one or more properties is gradual (e.g., linear, curvilinear) between a top surface and a bottom surface of the filter media. For example, the filter media may have an increasing amount of fibrillated fibers or non-fibrillated synthetic fibers from the top surface to the bottom surface of the filter media. In another embodiment, a filter media may include a step gradient in one more properties across the thickness of the filter media. In one such embodiment, the transition in the property may occur primarily at interface 40 between the two layers. For example, a filter media, e.g., having a first layer including a first fiber type (e.g., fibers with a first level of fibrillation) and a second layer including a second fiber type (e.g., fibers with a second level of fibrillation), may have an abrupt transition between fiber types across the interface. In other words, each of the layers of the filter media may be relatively distinct. Other types of gradients are also possible.

In embodiments in which the filter media includes at least first and second layers (e.g., upstream and downstream fiber web layers), such as in the embodiment shown illustratively in FIG. 1, the average CSF value of fibrillated fibers (if present) in each of the layers may vary. For example, if fibrillated fibers are included in the first layer (e.g., upstream layer), the average CSF value of the fibrillated fibers in the first layer may vary between about 10 mL and about 800 mL.

In certain embodiments, the average CSF value of the fibrillated fibers used in a first layer may be greater than or equal to 1 mL, greater than or equal to about 10 mL, greater than or equal to about 20 mL, greater than or equal to about 35 mL, greater than or equal to about 45 mL, greater than or equal to about 50 mL, greater than or equal to about 65 mL, greater than or equal to about 70 mL, greater than or equal to about 75 mL, greater than or equal to about 80 mL, greater than or equal to about 100 mL, greater than or equal to about 110 mL, greater than or equal to about 120 mL, greater than or equal to about 130 mL, greater than or equal to about 140 mL, greater than or equal to about 150 mL, greater than or equal to about 175 mL, greater than or equal to about 200 mL, greater than or equal to about 250 mL, greater than or equal to about 300 mL, greater than or equal to about 350 mL, greater than or equal to about 500 mL, greater than or equal to about 600 mL, greater than or equal to about 650 mL, greater than or equal to about 700 mL, or greater than or equal to about 750 mL.

In some embodiments, the average CSF value of the fibrillated fibers used in a first layer may be less than or equal to about 800 mL, less than or equal to about 750 mL, less than or equal to about 700 mL, less than or equal to about 650 mL, less than or equal to about 600 mL, less than or equal to about 550 mL, less than or equal to about 500 mL, less than or equal to about 450 mL, less than or equal to about 400 mL, less than or equal to about 350 mL, less than or equal to about 300 mL, less than or equal to about 250 mL, less than or equal to about 225 mL, less than or equal to about 200 mL, less than or equal to about 150 mL, less than or equal to about 140 mL, less than or equal to about 130 mL, less than or equal to about 120 mL, less than or equal to about 110 mL, less than or equal to about 100 mL, less than or equal to about 90 mL, less than or equal to about 85 mL, less than or equal to about 70 mL, less than or equal to about 50 mL, less than or equal to about 40 mL, or less than or equal to about 25 mL. Combinations of the above-referenced ranges are also possible (e.g., an average CSF value of fibrillated fibers of greater than or equal to about 10 mL and less than or equal to about 300 mL, greater than or equal to about 150 mL and less than or equal to about 250 mL, greater than or equal to about 10 mL and less than or equal to about 300 mL, greater than or equal to about 50 mL and less than or equal to about 400 mL, greater than or equal to about 50 mL and less than or equal to about 85 mL, or greater than or equal to about 10 mL and less than or equal to about 100 mL, or any of the other above-referenced ranges). Other ranges are also possible. The average CSF value of the fibrillated fibers used in a first layer may be based on one type of fibrillated fiber or more than one type fibrillated fiber.

In some embodiments, the weight percentage of the fibrillated fibers in the first layer is about 1 weight % or greater, about 2.5 weight % or greater, about 5 weight % or greater, about 10 weight % or greater, about 15 weight % or greater, or about 20 weight % or greater. In some embodiments, the weight percentage of the fibrillated fibers in the first layer is about 60 weight % or less, about 50 weight % or less, about 30 weight % or less, or about 21 weight % or less. It should be understood that the weight percentage of fibrillated fibers in the first layer may be between any of the above-noted lower limits and upper limits. For example, the weight percentage of fibrillated fibers in the first layer may be between about 1 weight % and about 60 weight %; in some embodiments, between about 2.5 weight % and about 60 weight %; in some embodiments, between about 5 weight % and about 60 weight %; in some embodiments, between about 10 weight % and about 50 weight %; in some embodiments, between about 10 weight % and about 40 weight %; in some embodiments, between about 10 weight % and about 30 weight %; in some embodiments, between about 10 weight % and about 25 weight %; and, in some embodiments, between about 10% by weight and about 20%, between about 1% by weight and about 10%, between about 2.5% by weight and about 10%, between about 5% by weight and about 10%, between about 1% by weight and about 15%, between about 2.5% by weight and about 15%, between about 5% by weight and about 15%, between about 10% by weight and about 15%, between about 1% by weight and about 20%, between about 2.5% by weight and about 20%, between about 5% by weight and about 20%, between about 15% by weight and about 20%, and the like.

If fibrillated fibers are included in the second layer (e.g., downstream layer), the average CSF value of the fibrillated fibers in the second layer may vary between about 10 mL and about 800 mL.

In certain embodiments, the average CSF value of the fibrillated fibers used in a second layer may be greater than or equal to 1 mL, greater than or equal to about 10 mL, greater than or equal to about 20 mL, greater than or equal to about 35 mL, greater than or equal to about 45 mL, greater than or equal to about 50 mL, greater than or equal to about 65 mL, greater than or equal to about 70 mL, greater than or equal to about 75 mL, greater than or equal to about 80 mL, greater than or equal to about 100 mL, greater than or equal to about 110 mL, greater than or equal to about 120 mL, greater than or equal to about 130 mL, greater than or equal to about 140 mL, greater than or equal to about 150 mL, greater than or equal to about 175 mL, greater than or equal to about 200 mL, greater than or equal to about 250 mL, greater than or equal to about 300 mL, greater than or equal to about 350 mL, greater than or equal to about 500 mL, greater than or equal to about 600 mL, greater than or equal to about 650 mL, greater than or equal to about 700 mL, or greater than or equal to about 750 mL.

In some embodiments, the average CSF value of the fibrillated fibers used in a second layer may be less than or equal to about 750 mL, less than or equal to about 700 mL, less than or equal to about 650 mL, less than or equal to about 600 mL, less than or equal to about 550 mL, less than or equal to about 500 mL, less than or equal to about 450 mL, less than or equal to about 400 mL, less than or equal to about 350 mL, less than or equal to about 300 mL, less than or equal to about 250 mL, less than or equal to about 225 mL, less than or equal to about 200 mL, less than or equal to about 150 mL, less than or equal to about 140 mL, less than or equal to about 130 mL, less than or equal to about 120 mL, less than or equal to about 110 mL, less than or equal to about 100 mL, less than or equal to about 90 mL, less than or equal to about 85 mL, less than or equal to about 70 mL, less than or equal to about 50 mL, less than or equal to about 40 mL, or less than or equal to about 25 mL. Combinations of the above-referenced ranges are also possible (e.g., an average CSF value of fibrillated fibers of greater than or equal to about 10 mL and less than or equal to about 300 mL, greater than or equal to about 150 mL and less than or equal to about 250 mL, greater than or equal to about 10 mL and less than or equal to about 300 mL, greater than or equal to about 50 mL and less than or equal to about 400 mL, greater than or equal to about 50 mL and less than or equal to about 85 mL, or greater than or equal to about 10 mL and less than or equal to about 100 mL, or any of the other ranges described herein). Other ranges are also possible. The average CSF value of the fibrillated fibers used in a second layer may be based on one type of fibrillated fiber or more than one type fibrillated fiber.

In some embodiments, the weight percentage of the fibrillated fibers in the second layer is about 1 weight % or greater, about 2.5 weight % or greater, about 5 weight % or greater, about 10 weight % or greater, about 15 weight % or greater, or about 20 weight % or greater. In some embodiments, the weight percentage of the fibrillated fibers in the second layer is about 60 weight % or less, about 50 weight % or less, about 30 weight % or less, or about 21 weight % or less. It should be understood that the weight percentage of fibrillated fibers in the second layer may be between any of the above-noted lower limits and upper limits. For example, the weight percentage of fibrillated fibers in the second layer may be between about 1 weight % and about 60 weight %; in some embodiments, between about 2.5 weight % and about 60 weight %; in some embodiments, between about 5 weight % and about 60 weight %; in some embodiments, between about 10 weight % and about 50 weight %; in some embodiments, between about 10 weight % and about 40 weight %; in some embodiments, between about 10 weight % and about 30 weight %; in some embodiments, between about 10 weight % and about 25 weight %; and, in some embodiments, between about 10% by weight and about 20%, between about 1% by weight and about 10%, between about 2.5% by weight and about 10%, between about 5% by weight and about 10%, between about 1% by weight and about 15%, between about 2.5% by weight and about 15%, between about 5% by weight and about 15%, between about 10% by weight and about 15%, between about 1% by weight and about 20%, between about 2.5% by weight and about 20%, between about 5% by weight and about 20%, between about 15% by weight and about 20%, and the like.

As noted above, the amount of fibrillated fibers and the level of fibrillation may vary between fiber web layers of the filter media. For example, the relative amount of fibrillated fibers and the level of fibrillation may vary when a first layer of a filter media is an upstream layer and a second layer of the filter media is a downstream layer. In some embodiments, an upstream layer has a lesser degree of fibrillation (i.e., greater average CSF) than a downstream layer. In other embodiments, an upstream layer has a greater degree of fibrillation than a downstream layer. In some embodiments, the percentage of fibrillated fibers in an upstream layer is comparatively smaller than the percentage of fibrillated fibers in a downstream layer. In other embodiments, the percentage of fibrillated fibers in an upstream layer is greater than the percentage of fibrillated fibers in a downstream layer.

In certain embodiments in which a filter media includes at least first and second layers, the second layer may include more fibrillated fibers than the first layer (e.g., at least 5%, at least 10%, at least 20%, at least 40%, at least 60%, at least 80%, at least 100%, at least 150%, at least 200%, at least 300%, at least 400%, at least 500%, or at least 1000% more fibrillated fibers than the first layer). For example, the second layer may include more fibrillated fibers than the first layer by a percent difference of between about 5% and about 500%, between about 5% and about 10%, between about 5% and about 20%, between about 10% and about 20%, between about 5% and about 30%, between about 5% and about 40%, between about 20% and about 30%, between about 30% and about 40%, between about 10% and about 50%, between about 5% and about 50%, between about 20% and about 50%, between about 30% and about 50%, between about 10% and about 100%, between about 50% and about 200%, between about 100% and about 300%, or between about 300% and about 500%.

In other embodiments, the first layer may include more fibrillated fibers than the second layer (e.g., at least 10%, at least 20%, at least 40%, at least 60%, at least 80%, at least 100%, at least 150%, at least 200%, at least 300%, at least 400%, at least 500%, or at least 1000% more fibrillated fibers than the second layer). For example, the first layer may include more fibrillated fibers than the second layer by a percent difference of between about 5% and about 500%, between about 5% and about 10%, between about 5% and about 20%, between about 10% and about 20%, between about 5% and about 30%, between about 5% and about 40%, between about 20% and about 30%, between about 30% and about 40%, between about 10% and about 50%, between about 5% and about 50%, between about 20% and about 50%, between about 30% and about 50%, between about 10% and about 100%, between about 50% and about 200%, between about 100% and about 300%, or between about 300% and about 500%.

Other ranges are also possible. In some cases, the same amount of fibrillated fibers are present in each of the layers.

In some embodiments in which a fiber web includes at least first and second layers, the second layer may include fibrillated fibers having a higher degree of fibrillation than the fibrillated fibers of the first layer. For example, the average CSF value of the fibrillated fibers of the first layer may be at least 5%, at least 10%, at least 20%, at least 40%, at least 60%, at least 80%, at least 100%, at least 150%, at least 200%, at least 300%, at least 400%, or at least 500% greater than the average CSF value of the fibrillated fibers of the second layer. For example, the average CSF value of the fibrillated fibers of the first layer may be greater than the average CSF value of the fibrillated fibers of the second layer by between about 5% and about 500%, between about 5% and about 10%, between about 5% and about 20%, between about 10% and about 20%, between about 5% and about 30%, between about 5% and about 40%, between about 20% and about 30%, between about 30% and about 40%, between about 10% and about 50%, between about 5% and about 50%, between about 20% and about 50%, between about 30% and about 50%, between about 10% and about 100%, between about 50% and about 200%, between about 100% and about 300%, or between about 300% and about 500%.

In other embodiments, the first layer may include fibrillated fibers having a higher degree of fibrillation than the fibrillated fibers of the second layer. For example, the average CSF value of the fibrillated fibers of the second layer may be at least 10%, at least 20%, at least 40%, at least 60%, at least 80%, at least 100%, at least 150%, at least 200%, at least 300%, at least 400%, or at least 500% greater than the average CSF value of the fibrillated fibers of the first layer. For example, the average CSF value of the fibrillated fibers of the second layer may be greater than the average CSF value of the fibrillated fibers of the first layer by between about 5% and about 500%, between about 5% and about 10%, between about 5% and about 20%, between about 10% and about 20%, between about 5% and about 30%, between about 5% and about 40%, between about 20% and about 30%, between about 30% and about 40%, between about 10% and about 50%, between about 5% and about 50%, between about 20% and about 50%, between about 30% and about 50%, between about 10% and about 100%, between about 50% and about 200%, between about 100% and about 300%, or between about 300% and about 500%.

Other ranges are also possible. In some cases, the fibrillated fibers in each of the layers has the same level of fibrillation.

In certain embodiments, a filter media may include a gradient in one or more properties through portions of the thickness of the filter media. In the portions of the filter media where the gradient in the property is not present, the property may be substantially constant through that portion of the media. As described herein, in some instances a gradient in a property involves different proportions of a component (e.g., a type of fibrillated fiber, a type of non-fibrillated synthetic fiber, an additive, a binder) across the thickness of a filter media. In some embodiments, a component may be present at an amount or a concentration that is different than another portion of the filter media. In other embodiments, a component is present in one portion of the filter media, but is absent in another portion of the filter media. Other configurations are also possible.

In some embodiments, a filter media has a gradient in one or more properties in two or more regions of the filter media. For example, a filter media having three layers may have a first gradient in one property across the first and second layer, and a second gradient in another property across the second and third layers. The first and second gradients may be the same in some embodiments, or different in other embodiments (e.g., characterized by a gradual vs. an abrupt change in a property across the thickness of the filter media). Other configurations are also possible.

A filter media may include any suitable number of layers, e.g., at least 2, 3, 4, 5, 6, 7, 8, or 9 layers depending on the particular application and performance characteristics desired. It should be appreciated that in some embodiments, the layers forming a filter media may be indistinguishable from one another across the thickness of the filter media. As such, a filter media formed from, for example, multiple "layers" (e.g., fiber webs) or two "fibrillated fiber and non-fibrillated synthetic fiber mixtures" can also be characterized as having a single "layer" (or a composite layer) having a gradient in a property across the filter media in some instances.

Fiber webs described herein may be used in an overall filtration arrangement or filter element. In some embodiments, additional layers or components are included with the fiber web (e.g., disposed adjacent to the fiber web, contacting one or both sides of the fiber web) in a filter element. The fiber web may be used in combination with another filtration layer formed of any suitable material using any appropriate method (e.g., wet laid, dry laid, spunbond, electrospun, electret-based, meltblown, etc). In some embodiments, in a filter element, the fiber web is used as a pre-filter layer, and a different layer (e.g., wet laid, dry laid, meltblown, coarse fiber electret media, spunbond, electrospun) is used as a main filter layer. However, it can be appreciated that the fiber web may also be used alone, or as a main filter in combination with another filter layer.

As described herein, in some embodiments two or more layers of a web may be formed separately, and combined by any suitable method such as lamination, collation, or by use of adhesives. The two or more layers may be formed using different processes, or the same process. For example, each of the layers may be independently formed by a wet laid process, a dry laid process, a spinning process, a meltblown process, or any other suitable process.

In some embodiments, two or more layers may be formed by the same process (e.g., a wet laid process, a dry laid process, a spinning process, a meltblown process, or any other suitable process). In some instances, the two or more layers may be formed simultaneously. In some embodiments, a gradient in at least one property may be present across the thickness of the two or more layers.

When a layer of the filter media, or an additional layer, is used as a meltblown layer, it may be a meltblown as described, for example, in commonly-owned U.S. Patent Publication No. 2009/0120048 which is based on U.S. patent application Ser. No. 12/266,892, filed on May 14, 2009; or commonly-owned U.S. patent application Ser. No. 12/971,539, filed on Dec. 17, 2010, both of which are incorporated herein by reference in its entirety.

Fibers of the one or more additional fiber webs may have any suitable dimensions. For instance, fibers of an additional fiber web layer (e.g., meltblown layer) may have an average diameter of between about 0.01 micron and about 20 microns, between about 0.05 microns and about 15 microns, between about 0.1 micron and about 10 microns, between about 0.2 microns and about 10 microns, between about 0.5 microns and about 6 microns, between about 0.5 microns and about 5 microns, between about 0.5 microns and about 4 microns, between about 0.5 microns and about 3 microns, between about 0.5 microns and about 2 microns, between about 0.5 microns and about 1.5 microns, or between about 0.5 microns and about 1 micron. In some embodiments, fibers of the additional fiber web layer may have an average length of between about 3 mm and about 12 mm, between about 4 mm and about 6 mm, or between about 5 mm and about 7 mm, or may be continuous fibers (e.g., meltblown).

When the additional fiber web(s) is a meltblown layer, the web may be formed of fibers having an average diameter between about 0.1 micron and about 1.5 microns. For instance, the fiber web may include meltblown fibers having an average diameter of between about 0.1 micron and about 1.3 microns, between about 0.1 micron and about 1.2 microns, between about 0.1 micron and about 1.0 microns, between about 0.25 microns and about 1.0 microns, between about 0.1 micron and about 0.8 microns, between about 0.1 micron and about 0.7 microns, between about 0.1 micron and about 0.6 microns, between about 0.1 micron and about 0.5 microns, between about 0.1 micron and about 0.4 microns, between about 0.5 microns and about 5 microns, between about 0.5 microns and about 4 microns, between about 0.5 microns and about 3 microns, between about 0.5 microns and about 2 microns, between about 0.5 microns and about 1.5 microns, or between about 0.5 microns and about 1 micron. In some embodiments, the average diameter of the meltblown fibers may be about 1.5 microns or less, about 1.4 microns or less, about 1.3 microns or less, about 1.2 microns or less, about 1.1 microns or less, about 1.0 microns or less, about 0.9 microns or less, about 0.8 microns or less, about 0.7 microns or less, about 0.6 microns or less, about 0.5 microns or less, about 0.4 microns or less, or about 0.3 microns or less. In other embodiments, the average diameter of the meltblown fibers may be greater than about 0.2 microns, greater than about 0.4 microns, greater than about 0.6 microns, greater than about 0.8 microns, greater than about 1.0 microns, or greater than about 1.2 microns. As used herein, fiber diameter is measured using scanning electron microscopy.

The additional fiber web(s) can generally have any suitable thickness. In some embodiments, the fiber web has a thickness between about 0.01 mm and about 50 mm, or between about 0.05 and about 50 mm. For instance, the thickness of the fiber web may be between about 0.1 and about 30 mm, between about 0.5 and about 10 mm, between about 1 and about 5 mm, between about 0.01 and about 1 mm, between about 0.02 mm and about 0.8 mm, between about 0.03 mm and about 0.5 mm, between about 0.05 mm and about 0.3 mm, or between about 0.05 mm and about 0.5 mm. In some instances, the thickness of the fiber web may be less than about 1 mm, less than about 0.8 mm, less than about 0.5 mm, or less than about 0.25 mm. In other instances, the thickness of the fiber web may be greater than about 0.03 mm, greater than about 0.1 mm, greater than about 0.25 mm, greater than about 0.5 mm, or greater than about 0.7 mm. As referred to herein, thickness is determined according to the standard ISO 534 tested at 2 N/cm$^2$.

The basis weight of the one or more additional fiber web(s) can typically be selected as desired. In some embodiments, the basis weight of the fiber web may be between about 1.0 g/m$^2$ and about 100 g/m$^2$. For instance, the basis weight of the fiber web may be between about 1.0 g/m$^2$ and about 70 g/m$^2$, between about 1.0 g/m$^2$ and about 50 g/m$^2$, between about 3.0 g/m$^2$ and about 30 g/m$^2$, or between about 3.0 g/m$^2$ and about 20 g/m$^2$. In some embodiments, the basis weight of the fiber web is greater than about 1 g/m$^2$ (e.g., greater than about 10 g/m$^2$, greater than about 25 g/m$^2$), and/or less than about 100 g/m$^2$ (e.g., less than about 90 g/m$^2$, less than about 75 g/m$^2$). As referred to herein, basis weight is determined according to ISO 536 Standard.

The mean pore size of the additional fiber web(s) can typically be selected as desired. In some embodiments, a fiber web has a mean pore size between about 1 micron and about 30 microns. For instance, the mean pore size may be between about 1 micron and about 20 microns, between about 1 micron and about 15 microns, between about 5 microns and about 15 microns, between about 1 micron and about 10 microns, or between about 5 microns and about 15 microns. In certain embodiments, the mean pore size may be less than about 30 microns, less than about 25 microns, less than about 20 microns, less than about 15 microns, less than about 10 microns, or less than about 5 microns. In other embodiments, the mean pore size may be greater than about 5 microns, greater than about 10 microns, greater than about 15 microns, greater than about 20 microns, greater than about 25 microns, or greater than about 30 microns. Other values and ranges of mean pore size are also possible. As used herein, mean pore size is measured according to the standard ASTM F-316-80 Method B, BS6410, e.g., using a Capillary Flow Porometer made by Porous Materials Inc.

Additional layers may include fiber webs having synthetic or naturally occurring fibers. When synthetic fibers are used, suitable thermoplastic polymeric materials may be selected. Exemplary polymer materials include polyolefins (e.g., polypropylenes), polyesters (e.g., polybutylene terephthalate, polybutylene naphthalate), polyamides (e.g., nylons), polycarbonates, polyphenylene sulfides, polystyrenes, polyurethanes (e.g., thermoplastic polyurethanes). Optionally, the polymer(s) may contain fluorine atoms. Examples of such polymers include PVDF and PTFE.

Additional layers may include fiber webs having fibrillated or non-fibrillated fibers. In some embodiments, for additional fiber web layers having fibrillated fibers, the average CSF level of fibrillation of the fibers may be 0 mL or greater, about 10 mL or greater, about 20 mL or greater, about 35 mL or greater, about 45 mL or greater, about 50 mL or greater, about 75 mL or greater, about 100 mL or greater, about 150 mL or greater, about 200 mL or greater, about 250 mL or greater, about 300 mL or greater, about 350 mL or greater, about 400 mL or greater, about 500 mL or greater, or about 600 mL or greater. In some embodiments, the average CSF value for fibrillated fibers in an additional fiber web layer is about 1000 mL or less, about 850 mL or less, about 600 mL or less, about 500 mL or less, about 400 mL or less, about 350 mL or less, about 300 mL or less, about 250 mL or less, about 200 mL or less, about 150 mL or less, about 100 mL or less, about 50 mL or less, or about 45 mL or less. It should be understood that the average CSF values may be between any of the above-noted lower limits and upper limits. For example, the average CSF value of the fibrillated fibers may be between about 45 mL and about 1000 mL, between about 50 mL and about 850 mL, between about 75 mL and about 850 mL, between about 100 mL and about 1000 mL, between about 150 mL and about 600 mL, between about 100 mL and about 300 mL, between about 150 mL and about 300 mL, between about 100 mL and about 350 mL, between about 150 mL and about 350 mL, between about 100 mL and about 400 mL, between about 150 mL and about 400 mL, between about 100 mL and about 450 mL, between about 150 mL and about 450 mL, between about 200 mL and about 500 mL, between about 200 mL and about 400 mL, between about 200 mL and about 300 mL, between about 250 mL and about 300 mL, and the like.

Different layers may be adhered together by any suitable method. For instance, layers may be adhered by an adhesive and/or melt-bonded to one another on either side. In some embodiments, an additional layer may be formed from any type of fiber or blend of fibers via an added headbox or a coater and appropriately adhered to another layer.

Accordingly, for some embodiments, the pre-filter, or main filter, may comprise the fiber web described herein in combination with an appropriate additional layer. In some embodiments, multiple fiber webs comprising predominantly fibrillated fibers and non-fibrillated synthetic fibers in accordance with embodiments discussed herein are layered together in forming a multi-layer sheet for use as a pre-filter and/or a main filter.

The fiber webs (and resulting filter media) may have a variety of desirable properties and characteristics which are described in the following paragraphs.

The overall basis weight of the fiber web can vary depending on factors such as the strength requirements of a given filtering application, the materials used to form the filter media, as well as the desired level of filter efficiency and permissible levels of resistance or pressure drop. In certain embodiments described herein, some fiber webs may have a low overall basis weight while achieving advantageous filtration performance or mechanical characteristics. For example, a fiber web incorporating fibrillated fibers which provides for an enhanced surface area of the fiber web may have a lower basis weight without sacrificing strength.

In some embodiments, the basis weight of the fiber web may range from between about 5 and about 1000 g/m$^2$, between about 10 and about 1000 g/m$^2$, between about 15 and about 500 g/m$^2$, between about 15 and about 150 g/m$^2$, between about 30 and about 150 g/m$^2$, between about 90 g/m$^2$ and about 150 g/m$^2$, between about 30 g/m$^2$ and about 100 g/m$^2$, or between about 40 g/m$^2$ and about 70 g/m$^2$. As determined herein, the basis weight of the fiber web is measured according to the ISO 536 Standard. Values are expressed in grams per square meter.

Thickness, as referred to herein, is determined according to ISO 534 tested at 2 N/cm$^2$. The overall thickness of the fiber web may be between about 0.05 mm and about 100.0 mm, between about 0.10 mm and about 50.0 mm, between about 0.10 mm and about 10.0 mm, between about 0.15 mm and about 1.0 mm, between about 0.20 mm and about 0.90 mm, between about 0.2 mm and about 0.8 mm, or between about 0.25 mm and about 0.50 mm.

The fiber web may exhibit a suitable mean flow pore size. Mean flow pore size, as determined herein, is measured according to ASTM E1294. In some embodiments, the mean flow pore size may range between about 5 microns and about 50 microns, between about 5 microns and about 40 microns, between about 15 microns and about 40 microns, or between about 25 microns and about 40 microns.

As noted above, fiber webs described herein may be employed as a pre-filter in combination with a main filter (e.g., meltblown layer). The structural characteristics including basis weight, thickness, and mean flow pore size of the combined filtration arrangement including a pre-filter comprising a fiber web as described herein and a main filter (e.g., comprising a meltblown layer) may also fall within the ranges described above.

In some embodiments, it may be preferable for the fiber web to exhibit certain mechanical properties. For example, as described above, a fiber web comprised primarily of fibrillated fibers and non-fibrillated synthetic fibers (e.g., a fiber web having limited amounts of, or no, glass fiber) may give rise to a relatively flexible and strong filter media that does not include with it the environmental issues associated with conventional glass fibers in the filter media. In some embodiments, fiber webs described herein that have little to no glass fibers may exhibit a greater degree of elongation, burst strength and/or tensile strength relative to fiber webs having comparatively more glass fibers incorporated therein.

In some embodiments, the tensile elongation in the machine direction of the fiber web may be greater than about 0.2%, greater than about 0.5%, or greater than about 0.8%. For example, the tensile elongation in the machine direction of the fiber web may be between about 0.2% and about 4.0%, between about 0.2% and about 3.0%, between about 0.5% and about 3.5%, between about 0.5% and about 2.0%, between about 1.0% and about 3.0%, or between about 1.5% and about 2.5%. In some embodiments, the tensile elongation in the cross-machine direction of the fiber web may be greater than about 0.2%, greater than about 0.5%, greater than about 0.8%, or greater than about 1.0%. For example, the tensile elongation in the cross-machine direction of the fiber web may be between about 0.2% and about 6.0%, between about 0.2% and about 5.0%, between about 0.2% and about 4.0%, between about 0.5% and about 4.5%, between about 1.0% and about 3.5%, between about 1.0% and about 3.0%, or between about 2.0% and about 3.5%. In some cases, fiber webs that exhibit an increased degree of elongation may also be more pleatable, for example, by exhibiting an overall reduction in potential damage that may arise at the edges of the filter media.

Fiber webs described herein may be used as a pre-filter in combination with a main filter (e.g., meltblown layer). In some embodiments, the combined pre-filter and main filter arrangement may have a tensile elongation in the cross-machine direction of greater than about 0.2%, greater than about 0.5%, greater than about 0.8%, or greater than about 1%. For example, the tensile elongation in the cross-machine direction of the combined pre-filter and main filter arrangement may be between about 0.1% and about 10%, between about 0.2% and about 6%, between about 0.5% and about 5%, or between about 1% and about 5%. In some embodiments, the combined pre-filter and main filter arrangement (e.g., with a meltblown layer as the main filter) may have a tensile elongation in the machine direction of greater than about 0.2%, greater than about 0.5%, or greater than about 0.8%. For instance, the tensile elongation in the machine direction of the combined pre-filter and main filter arrangement may be between about 0.1% and about 10%, between about 0.2% and about 6%, between about 0.2% and about 4%, or between about 0.5% and about 4%.

The tensile strength in the machine direction of the fiber web may be greater than about 2 N/15 mm, greater than about 4 N/15 mm, or greater than about 6 N/15 mm. For example, the tensile strength in the machine direction of the fiber web may be between about 3 N/15 mm and about 20 N/15 mm, between about 1 N/15 mm and about 6 N/15 mm, or between about 10 N/15 mm and about 20 N/15 mm. The tensile strength of the fiber web in the cross-machine direction may be greater than about 1 N/15 mm, or greater than about 3 N/15 mm and may also be between about 1 N/15 mm and about 6 N/15 mm, between about 2 N/15 mm and about 10 N/15 mm, or between about 3 N/15 mm and about 9 N/15 mm. In some cases, the cross machine direction tensile strength may be greater or less than the machine direction tensile strength.

In some embodiments, the combined pre-filter and main filter arrangement (e.g., with a meltblown layer as the main filter) may have a tensile strength in the cross-machine direction of greater than about 1 N/15 mm, greater than about 2 N/15 mm, or greater than about 4 N/15 mm. For example, the tensile strength in the cross-machine direction of the combined pre-filter and main filter arrangement (e.g., with a meltblown layer as the main filter) may be between about 1 N/15 mm and about 25 N/15 mm, between about 3 N/15 mm and about 20 N/15 mm, between about 1 N/15 mm and about 6 N/15 mm, or between about 10 N/15 mm and about 20 N/15 mm. In some embodiments, the combined pre-filter and main filter arrangement (e.g., with a meltblown layer as the main filter) may have a tensile strength in the machine direction of greater than about 3 N/15 mm, greater than about 5 N/15 mm, or greater than about 7 N/15 mm. For example, the tensile strength in the machine direction of the combined pre-filter and main filter arrangement (e.g., with a meltblown layer as the main filter) may be between about 1 N/15 mm and about 40 N/15 mm, between about 5 N/15 mm and about 30 N/15 mm, or between about 5 N/15 mm and about 10 N/15 mm. Tensile strength and tensile elongation are measured according to the following Standard EN/ISO 1924-2.

Dry Schopper burst tests may be used as a further test for strength in measuring the pressure required for puncturing the fiber web as an indicator of the load carrying capacity of the fiber web under certain conditions. Dry Schopper burst strength is measured according to DIN 53113. In some embodiments, the dry Schopper burst strength for the fiber web may be greater than about 15 kPa, greater than about 30 kPa, greater than about 40 kPa, or between about 5 kPa and about 120 kPa, between about 5 kPa and about 50 kPa, or between about 30 kPa and about 100 kPa.

In some embodiments, the combined pre-filter and main filter arrangement (e.g., with a meltblown layer as the main filter) may have a dry Schopper burst strength of greater than about 15 kPa, greater than about 20 kPa, greater than about 25 kPa, greater than about 30 kPa, or between about 1 kPa and about 250 kPa, between about 5 kPa and about 200 kPa, between about 15 kPa and about 150 kPa, or between about 30 kPa and about 100 kPa.

The fiber web described herein may also exhibit advantageous filtration performance characteristics, such as dust holding capacity (DHC), beta efficiency, air permeability, amongst others.

The fiber webs described herein can have beneficial dust holding properties. In some embodiments, the fiber web may have a DHC of greater than about 30 g/m$^2$, greater than about 40 g/m$^2$, greater than about 60 g/m$^2$, greater than about 80 g/m$^2$, greater than about 100 g/m$^2$, or greater than about 150 g/m$^2$. In some cases, the fiber web can have an overall DHC of between about 30 g/m$^2$ and about 250 g/m$^2$, between about 30 g/m$^2$ and about 180 g/m$^2$, between about 50 g/m$^2$ and about 230 g/m$^2$, between about 50 g/m$^2$ and about 200 g/m$^2$, between about 70 g/m$^2$ and about 200 g/m$^2$, between about 50 g/m$^2$ and about 150 g/m$^2$, between about 90 g/m$^2$ and about 150 g/m$^2$, or between about 100 g/m$^2$ and about 130 g/m$^2$. In some embodiments, fiber webs having a greater amount of fibrillated fibers (e.g., lyocell) incorporated therein may exhibit a greater dust holding capacity than fiber webs having a comparatively smaller amount of fibrillated fibers (e.g., lyocell), possibly due to the increased surface area provided by the fine fibrils of the fibrillated fibers.

As noted above, fiber webs described herein may be employed as a pre-filter in combination with a main filter (e.g., meltblown layer). The combined filtration arrangement including a pre-filter comprising a fiber web as described herein and a main filter (e.g., comprising a meltblown layer) may exhibit beneficial dust holding properties. In some embodiments, the combined pre-filter and main filter arrangement may have a DHC of greater than about 40 g/m$^2$, greater than about 50 g/m$^2$, greater than about 60 g/m$^2$, greater than about 80 g/m$^2$, greater than about 100 g/m$^2$, or greater than about 150 g/m$^2$. In some embodiments, the combined pre-filter and main filter arrangement may have an overall DHC of between about 10 g/m$^2$ and about 300 g/m$^2$, between about 30 g/m$^2$ and about 250 g/m$^2$, between about 50 g/m$^2$ and about 230 g/m$^2$, between about 50 g/m$^2$ and about 200 g/m$^2$, between about 70 g/m$^2$ and about 200 g/m$^2$, between about 50 g/m$^2$ and about 150 g/m$^2$, between about 90 g/m$^2$ and about 150 g/m$^2$, or between about 100 g/m$^2$ and about 130 g/m$^2$.

The dust holding capacity, as referred to herein, is tested based on a Multipass Filter Test following the ISO 16889 procedure (modified by testing a flat sheet sample) on a Multipass Filter Test Stand manufactured by Graphischer Maschinenbau Nordhausen GmbH (GMN). The testing uses ISO A3 Medium test dust manufactured by PTI, Inc. at an upstream gravimetric dust level of 10 mg/liter. The test fluid is Aviation Hydraulic Fluid UNIVIS HVI 13 manufactured by Mobil. The test is run at a face velocity of 0.42 cm/sec with a hydraulic load of 0.025 L/cm$^2$min until a terminal pressure of 2 bars above the baseline filter pressure drop is obtained.

The efficiency of filtering various particle sizes can be measured using the Multipass Filter Test described above. Suitable fiber webs may be used for the filtration of particles having a size, for example, of less than or equal to about 50 microns, less than or equal to about 30 microns, less than or equal to about 20 microns, less than or equal to about 15 microns, less than or equal to about 10 microns, less than or equal to about 5 microns, less than or equal to about 3 microns, or less than or equal to about 1 micron. Particle counts (particles per milliliter) at the minimum particle sizes selected (e.g., 3, 4, 5, 7, 10, 15, 20, 25, 30, 40 or 50 microns) upstream and downstream of the media can be taken at ten points equally divided over the time of the test. The average of upstream and downstream particle counts can be taken at each selected minimum particle size and particles greater than that size. From the average particle count upstream (injected, $C_0$) and the average particle count downstream (passed thru, C) the liquid filtration efficiency test value for each minimum particle size selected can be determined by the relationship $[(1-[C/C_0])*100\%]$.

Efficiency can also be expressed in terms of a Beta efficiency ratio, expressed as $Beta_{(x)}=y$, where x is the minimum particle size that will achieve a ratio of $C_0$ to C that is expressed as y. The penetration fraction of the media is 1 divided by the $Beta_{(x)}$ value (y), and the efficiency fraction is 1−penetration fraction. Accordingly, the efficiency of the media is 100 times the efficiency fraction, and $100*(1-1/Beta_{(x)})$=efficiency percentage. For example, the fiber web having a $Beta_{(x)}=200$ has an efficiency of $[1-(1/200)]*100$, or 99.5% for x micron or greater particles.

The fiber web described herein may have a wide range of Beta ratios, e.g., a $Beta_{(x)}=y$, where x can be, for example, between 1 and 100 microns, between about 1 micron and about 50 microns, between about 4 microns and about 40 microns, greater than about 1 micron, greater than about 3 microns, greater than about 10 microns, greater than about 15 microns, or greater than about 30 microns; and where y can be, for example, between 2 and 10,000, greater than about 50, greater than about 100, greater than about 200, greater than about 300, greater than about 500, greater than about 800, or greater than about 1,000. It should be understood that other values of x and y are also possible; for instance, in some cases, y may be greater than 2,000, and up to 10,000. It should also be understood that for any value of x, y may be any number representing the actual ratio of $C_0$ to C. Likewise, for any value of y, x may be any number representing the minimum particle size that will achieve the actual ratio of $C_0$ to C that is equal to y.

In some embodiments, a particle size (e.g., particle diameter) where $Beta_{(x)}=200$ (i.e., a beta efficiency of 200) for the fiber web may range between about 1 micron and about 50 microns, between about 3 microns and about 50 microns, between about 15 microns and about 40 microns, between about 20 microns and about 40 microns, or between about 4 microns and about 25 microns. Or, put another way, the fiber web may have a beta efficiency of about 200 for particles having an average diameter between the above noted ranges.

Beta efficiency values described above are applicable for single pre-filter arrangements as well as for arrangements that include both a pre-filter and main filter. For example, the combined filtration arrangement including a pre-filter comprising a fiber web as described herein and a main filter (e.g., comprising a meltblown layer) may exhibit a beta efficiency of about 200 for particles having an average diameter of between about 1 micron and about 50 microns, between about 2 microns and about 50 microns, between about 3 microns and about 50 microns, between about 3 microns and about 35 microns, between about 3 microns and about 30 microns, or between about 10 microns and about 20 microns.

The fiber webs may exhibit suitable air permeability characteristics. In some embodiments, the air permeability may range from between about 1 cubic feet per minute per square foot (cfm/sf) and about 500 cfm/sf, between about 1 cfm/sf and about 250 cfm/sf, between about 2 cfm/sf and about 250 cfm/sf, between about 10 cfm/sf and about 250 cfm/sf, between about 50 cfm/sf and about 125 cfm/sf, between about 5 cfm/sf and about 150 cfm/sf, between about 10 cfm/sf and about 150 cfm/sf, or between about 50 cfm/sf and about 150 cfm/sf.

For a combined filtration arrangement including a pre-filter comprising a fiber web as described herein and a main filter (e.g., comprising a meltblown layer), the air permeability may range between about 1 cubic feet per minute per square foot (cfm/sf) and about 500 cfm/sf, between about 1 cfm/sf and about 250 cfm/sf, between about 1.5 cfm/sf and about 250 cfm/sf, between about 5 cfm/sf and about 150 cfm/sf, between about 6 cfm/sf and about 125 cfm/sf, between about 10 cfm/sf and about 150 cfm/sf, or between about 10 cfm/sf and about 50 cfm/sf.

As determined herein, the air permeability is measured according to EN ISO 9237. The air permeability is an inverse function of air resistance and can be measured with a Frazier Permeability Tester using a 10 $cm^2$ test area at a 40 cm/s face velocity. The Frazier Permeability Tester measures the volume of air per unit of time that passes through a unit area of sample at a fixed differential pressure of 0.5 inches water across the sample.

The air resistance of the fiber web is measured in accordance with the above permeability test. In some embodiments, the air resistance of the fiber web may range from between about 0.5 mbar and about 50 mbar, between about 0.5 mbar and about 10 mbar, or between about 0.5 mbar and about 2 mbar.

Fiber webs described herein may be produced using suitable processes, such as using a wet laid or a dry laid process. In general, a wet laid process involves mixing together of the fibers; for example, non-fibrillated synthetic fibers (e.g., mono-component and/or bi-component fibers) may be mixed together with fibrillated fibers (e.g., lyocell fibers), or any other components (e.g., other types of synthetic fibers), to provide a fiber slurry. In some cases, the slurry is an aqueous-based slurry. In certain embodiments, non-fibrillated synthetic fibers, fibrillated fibers, and any other appropriate fibers, are optionally stored separately, or in combination, in various holding tanks prior to being mixed together (e.g., to achieve a greater degree of uniformity in the mixture).

For instance, the non-fibrillated synthetic fibers may be mixed and pulped together in one container and the fibrillated fibers may be mixed and pulped in a separate container. The non-fibrillated synthetic fibers and the fibrillated fibers may subsequently be combined together into a single fibrous mixture. Appropriate fibers may be processed through a pulper before and/or after being mixed together. In some embodiments, combinations of non-fibrillated synthetic fibers, fibrillated fibers and/or other synthetic fibers are processed through a pulper and/or a holding tank prior to being mixed together. It can be appreciated that other components may also be introduced into the mixture.

Any suitable method for creating a fiber slurry may be used. In some embodiments, further additives are added to the slurry to facilitate processing. The temperature may also be adjusted to a suitable range, for example, between 33° F. and 100° F. (e.g., between 50° F. and 85° F.). In some cases, the temperature of the slurry is maintained. In some instances, the temperature is not actively adjusted.

In some embodiments, the wet laid process uses similar equipment as in a conventional papermaking process, for example, a hydropulper, a former or a headbox, a dryer, and an optional converter. As discussed above, the slurry may be prepared in one or more pulpers. After appropriately mixing the slurry in a pulper, the slurry may be pumped into a headbox where the slurry may or may not be combined with other slurries. Other additives may or may not be added. The slurry may also be diluted with additional water such that the final concentration of fiber is in a suitable range, such as for example, between about 0.1% to 0.5% by weight.

In some cases, the pH of the fiber slurry may be adjusted as desired. For instance, fibers of the slurry may be dispersed under generally neutral conditions.

Before the slurry is sent to a headbox, the slurry may optionally be passed through centrifugal cleaners and/or pressure screens for removing unfiberized material. The slurry may or may not be passed through additional equipment such as refiners or deflakers to further enhance the dispersion or fibrillation of the fibers. For example, deflakers may be useful to smooth out or remove lumps or protrusions that may arise at any point during formation of the fiber slurry. Fibers may then be collected on to a screen or wire at an appropriate rate using any suitable equipment, e.g., a fourdrinier, a rotoformer, a cylinder, or an inclined wire fourdrinier.

As discussed above, multiple layers may be appropriately arranged or stacked together. In some embodiments, fiber webs are formed and laminated together with a suitable adhesive positioned in between layers. Or, fiber webs may be melt-bonded together, for example, through a suitable heating step.

In certain embodiments, two or more layers are formed by a wet laid process. For example, a first dispersion (e.g., a pulp) containing fibers in a solvent (e.g., an aqueous solvent such as water) can be applied onto a wire conveyor in a papermaking machine (e.g., a fourdrinier or a rotoformer) to form first layer supported by the wire conveyor. A second dispersion (e.g., another pulp) containing fibers in a solvent (e.g., an aqueous solvent such as water) is applied onto the first layer either at the same time or subsequent to deposition of the first layer on the wire. Vacuum is continuously applied to the first and second dispersions of fibers during the above process to remove the solvent from the fibers, thereby resulting in an article containing first and second layers. The article thus formed is then dried and, if necessary, further processed (e.g., calendered) by using known methods to form multi-layered fiber webs. In some embodiments, such a process may result in a gradient in at least one property across the thickness of the two or more layers.

In some embodiments, the process involves introducing binder (and/or other components) into a pre-formed fiber layer (e.g., including lyocell with non-fibrillated synthetic fibers). In some embodiments, as the fiber layer is passed along an appropriate screen or wire, different components included in the binder, which may be in the form of separate emulsions, are added to the fiber layer using a suitable technique. In some cases, each component of the binder resin is mixed as an emulsion prior to being combined with the other components and/or fiber layer. In some embodiments, the components included in the binder may be pulled through the fiber layer using, for example, gravity and/or vacuum. In some embodiments, one or more of the components included in the binder resin may be diluted with softened water and pumped into the fiber layer. In some embodiments, a binder may be introduced to the fiber layer by spraying onto the formed media, or by any other suitable method, such as for example, size press application, foam saturation, curtain coating, rod coating, amongst others. In some embodiments, a binder material may be applied to a fiber slurry prior to introducing the slurry into a headbox. For example, the binder material may be introduced (e.g., injected) into the fiber slurry and impregnated with and/or precipitated on to the fibers.

In other embodiments, a dry laid process is used. In a dry laid process, an air laid process or a carding process may be used. For example, in an air laid process, non-fibrillated synthetic fibers may be mixed along with fibrillated fibers (e.g., lyocell) while air is blown onto a conveyor, and a binder is then applied. In a carding process, in some embodiments, the fibers are manipulated by rollers and extensions (e.g., hooks, needles) associated with the rollers prior to application of the binder. In some cases, forming the fiber webs through a dry laid process may be more suitable for the production of a highly porous media. The dry fiber web may be impregnated (e.g., via saturation, spraying, etc.) with any suitable binder resin, as discussed above.

The fiber webs and filter media disclosed herein can be incorporated into a variety of filter elements for use in various applications including hydraulic and non-hydraulic filtration applications, including fuel applications, lube applications, air applications, amongst others. Exemplary uses of hydraulic filters (e.g., high-, medium-, and low-pressure filters) include mobile and industrial filters.

During use, the fiber webs mechanically trap particles on or in the layers as fluid flows through the filter media. The fiber webs need not be electrically charged to enhance trapping of contamination. Thus, in some embodiments, the filter media are not electrically charged. However, in some embodiments, the filter media may be electrically charged.

EXAMPLES

The following examples are intended to illustrate certain embodiments of the present invention, but are not to be construed as limiting and do not exemplify the full scope of the invention.

Eight fiber webs including different blends of non-fibrillated synthetic fibers and lyocell fibers were produced (Examples 1-8). Each fiber web included polyester fibers obtained commercially from different manufacturers. PES 0.3 dtex TA04 PN 5 mm polyester fibers were obtained from Teijin; and PES 0.6 dtex CHDA 905 6 mm polyester fibers were obtained from Barnet. The PES 0.3 dtex fibers from Teijin had an average diameter of between 2-3 microns. The PES 0.6 dtex fibers from Barnet had an average diameter of between 5-6 microns. Each fiber web also included lyocell fibers. The lyocell fibers were Lyocell VZL 5 mm fibers obtained from STW, having a CSF level of fibrillation of 240 and a SR of 48-50. Four of the eight fiber webs included thermoplastic bi-component fibers, specifically Bico TJ04CN 1.7 dtex/5 mm fibers obtained from Teijin.

The relative weight percentages of the fibers of each of the eight fiber web compositions are listed in Table 1 provided below. As shown, the PES 0.3 dtex and PES 0.6 dtex fibers were blended at a ratio of 50:50. The weight percentage of lyocell fibers varied from 12% to 21% of the fibers for each of the fiber web compositions. The fiber webs of Examples 1, 3, 5 and 7 are free of a thermoplastic bi-component fiber while the fiber webs of Examples 2, 4, 6 and 8 include a thermoplastic bi-component fiber in an amount of 4.5% by weight of the fibers of the fiber web.

TABLE 1

Fiber Web Compositions for Examples 1-8.

|  | Example 1 | Example 2 | Example 3 | Example 4 | Example 5 | Example 6 | Example 7 | Example 8 |
|---|---|---|---|---|---|---|---|---|
| Polyester PES 0.3 dtex (wt. %) | 44 | 41.8 | 42.5 | 40.3 | 41 | 38.8 | 39.5 | 37.3 |
| Polyester PES 0.6 dtex (wt. %) | 44 | 41.8 | 42.5 | 40.3 | 41 | 38.8 | 39.5 | 37.3 |
| Lyocell 5 mm fiber length (wt. %) | 12 | 12 | 15 | 15 | 18 | 18 | 21 | 21 |
| Bi-component fiber 1.7 dtex (wt. %) | 0 | 4.5 | 0 | 4.5 | 0 | 4.5 | 0 | 4.5 |

The process of forming the fiber webs of Examples 1-8 was as follows. The fibers were mixed and pulped in a wet laid process to form an aqueous-based fiber slurry. The lyocell fibers were placed in a container with water so as to form a slurry having a volume of 400 L. The lyocell mixture was stirred and pulped for 10 minutes, separate from the other non-fibrillated synthetic fibers (i.e., PES 0.3 dtex fibers, PES 0.6 dtex fibers and bi-component fibers). For Examples 1, 3, 5 and 7, the PES 0.3 dtex fibers and PES 0.6 dtex fibers were mixed and pulped in a container separate from the lyocell. For Examples 2, 4, 6 and 8, the PES 0.3 dtex fibers, PES 0.6 dtex fibers and bi-component fibers were mixed and pulped in a container separate from the lyocell. The respective lyocell and non-fibrillated synthetic fiber mixtures were mixed together into a container where water was subsequently added so that the fiber slurry reached a total volume of 2600 L. A deflaker was used to remove fiber lumps and to generally increase uniformity of the fiber slurry at various points during the process.

After mixing, the slurry was pumped into the headbox. Subsequently, the fiber slurry exited the headbox and was placed on an inclined wire where it was then collected, dried on a hot cylinder, and formed into a filter media. The media also contained an acrylic binder resin which was added during the manufacturing process.

For comparison with Examples 1-8, a glass fiber web was also produced using the same process described above except all of the fibers were glass fibers. Other than the use of all glass fibers, the method of manufacture was the same as that described above for Examples 1-8, including the incorporation of the acrylic binder resin. The glass fiber web was measured to have a basis weight of approximately 60 g/m².

Performance characteristics of the filter media were measured with a Multipass Filter Test using differently sized micron particles—5, 10, 15, 20, 25, 30, 40 microns. From the Multipass Filter Test, the beta efficiency ratio and the dust holding capacity of the filter media were measured. Mechanical characteristics of the filter media were also assessed, including tensile elongation, tensile strength and burst strength, using the tensile and burst strength tests discussed previously. Various structural, mechanical and performance properties of the filter media for Examples 1-8 are listed in Table 2, provided below.

TABLE 2

Structural, Mechanical and Performance Properties for Examples 1-8.

|  | Example 1 | Example 2 | Example 3 | Example 4 | Example 5 | Example 6 | Example 7 | Example 8 |
|---|---|---|---|---|---|---|---|---|
| Basis Weight (g/m²) | 59 | 61 | 61 | 61 | 61 | 62 | 61 | 60 |
| Thickness@2N/cm² (mm) | 0.36 | 0.37 | 0.37 | 0.37 | 0.37 | 0.37 | 0.38 | 0.36 |
| Air Resistance@40 cm/s (mbar) | 0.98 | 1 | 1.06 | 1.07 | 1.2 | 1.24 | 1.45 | 1.48 |
| Air Permeability (l · m²/s) | 896 | 869 | 824 | 815 | 733 | 719 | 610 | 600 |
| Air Permeability (cfm) | 112.1 | 108.8 | 103.1 | 102 | 91.7 | 90 | 76.3 | 75 |
| Tensile Strength MD (N/15 mm) | 11 | 12.4 | 11.4 | 11.8 | 12.6 | 13.3 | 15.5 | 17.7 |
| Tensile Strength CD (N/15 mm) | 4.5 | 6.2 | 4.5 | 6.3 | 6.8 | 6.7 | 6.6 | 8 |
| Tensile Elongation MD (%) | 0.96 | 1.34 | 1.13 | 1.52 | 1.2 | 1.63 | 1.48 | 1.92 |
| Tensile Elongation CD (%) | 1.37 | 2.02 | 2.2 | 2.73 | 2.1 | 2.78 | 2.3 | 2.83 |
| Burst Strength (kPa) | 36 | 75 | 43 | 77 | 48 | 93 | 59 | 97 |
| Mean Flow Pore size (microns) | 35.96 | 36.93 | 31.4 | 30.08 | 30 | 29.6 | 30.69 | 29.15 |
| Beta 200 (microns) | 33.2 | — | — | — | — | — | 31.9 | — |

TABLE 2-continued

Structural, Mechanical and Performance Properties for Examples 1-8.

| | Example 1 | Example 2 | Example 3 | Example 4 | Example 5 | Example 6 | Example 7 | Example 8 |
|---|---|---|---|---|---|---|---|---|
| Dust Holding Capacity (g/m$^2$) | 86 | — | — | — | — | — | 107 | 115 |

Figure 2A:
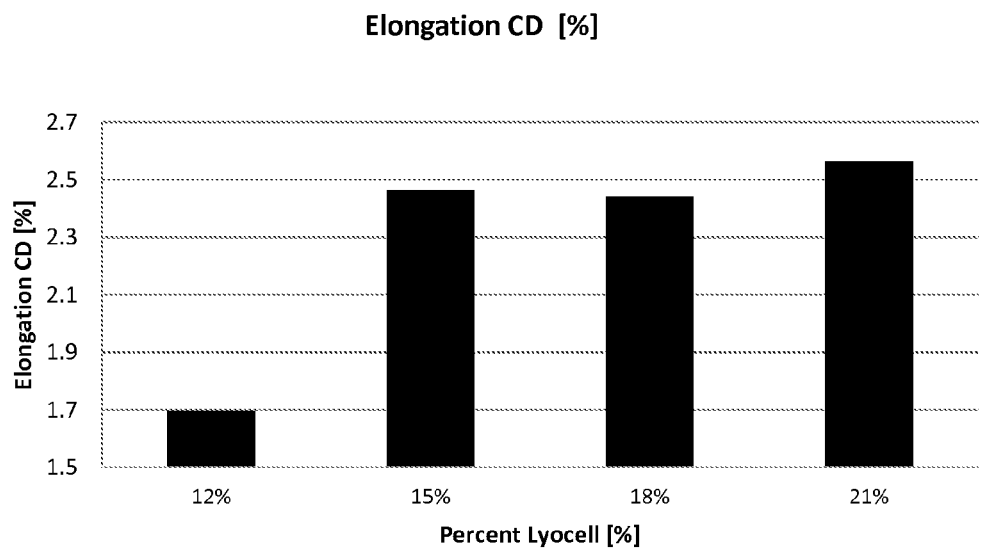
FIG. 2A depicts tensile elongation measurements in the cross-machine direction for fiber web examples having lyocell of varying weight percentage.
Figure 2B:
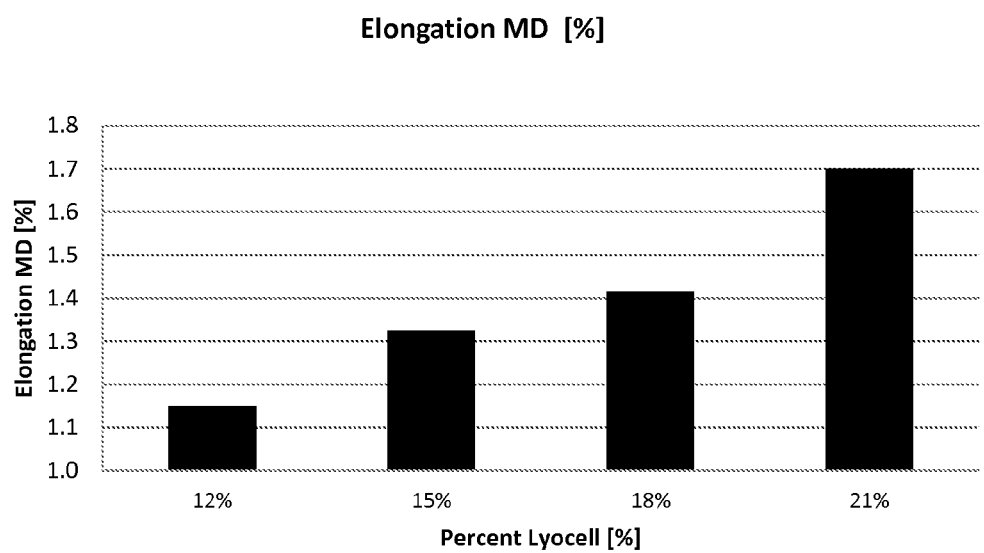
FIG. 2B depicts tensile elongation measurements in the machine direction for fiber web examples having lyocell of varying weight percentage.

It was observed that as the amount of lyocell in fiber webs increased, the tensile elongation of the fiber webs in both the cross-machine and machine directions generally increased. FIGS. 2A-2B illustrate the trend in the data given in Table 2 for tensile elongation in both the cross-machine direction and the machine direction, respectively, as a function of the amount of lyocell incorporated in the fiber web Examples. In these graphs, the average tensile elongation in the cross-machine and machine directions was measured for fiber webs each having a corresponding amount of lyocell percentage incorporated therein. Thus, FIG. 2A depicts: the average tensile elongation measured in the cross-machine direction for Examples 1 and 2 (calculated for a fiber web having a 12% amount of lyocell incorporate therein); the average tensile elongation measured in the cross-machine direction for Examples 3 and 4 (calculated for a fiber web having a 15% amount of lyocell incorporated therein); the average tensile elongation measured in the cross-machine direction for Examples 5 and 6 (calculated for a fiber web having a 18% amount of lyocell incorporated therein); and the average tensile elongation measured in the cross-machine direction for Examples 7 and 8 (calculated for a fiber web having a 21% amount of lyocell incorporated therein). FIG. 2B depicts: the average tensile elongation measured in the machine direction for Examples 1 and 2; the average tensile elongation measured in the machine direction for Examples 3 and 4; the average tensile elongation measured in the machine direction for Examples 5 and 6; and the average tensile elongation measured in the machine direction for Examples 7 and 8.

Figure 3A:
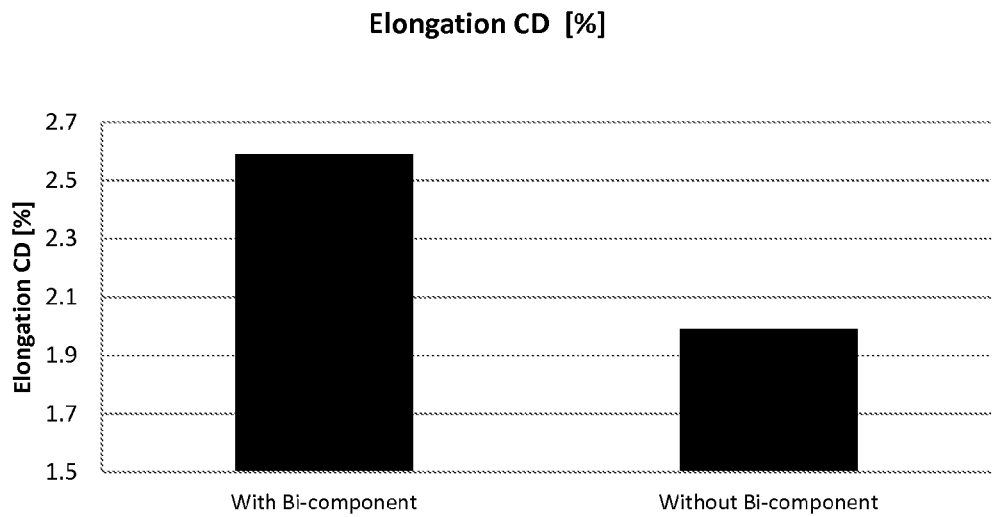
FIG. 3A depicts tensile elongation measurements in the cross-machine direction for fiber web examples with and without bi-component fibers.
Figure 3B:
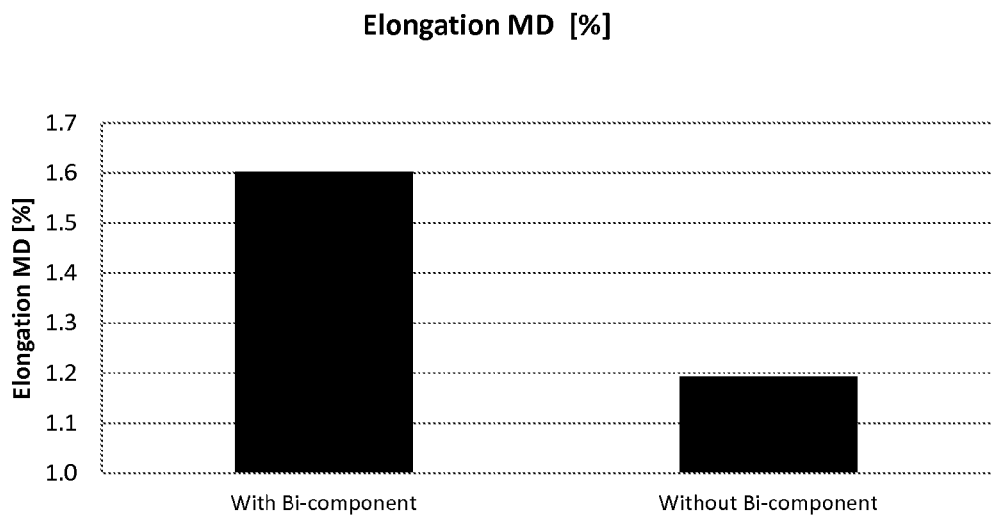
FIG. 3B depicts tensile elongation measurements in the machine direction for fiber web examples with and without bi-component fibers.

Fiber webs including bi-component fibers were also observed to exhibit a greater tensile elongation in both the cross-machine and machine directions as compared with fiber webs that did not incorporate bi-component fibers. FIGS. 3A-3B depict the comparative difference in tensile elongation in both the cross-machine direction and the machine direction, respectively, for fiber webs that incorporate bi-component fibers and fiber webs that do not incorporate bi-component fibers. In these graphs, the average tensile elongation was measured for fiber webs that incorporate or do not incorporate bi-component fibers. Thus, FIG. 3A illustrates: the average tensile elongation measured in the cross-machine direction for Examples 1, 3, 5 and 7 (calculated for a fiber web incorporating no bi-component fiber); and the average tensile elongation measured in the cross-machine direction for Examples 2, 4, 6 and 8 (calculated for a fiber web having a 4.5% amount of bi-component fiber incorporated therein). FIG. 3B depicts: the average tensile elongation measured in the cross-machine direction for Examples 1, 3, 5 and 7; and the average tensile elongation measured in the cross-machine direction for Examples 2, 4, 6 and 8.

Figure 4:
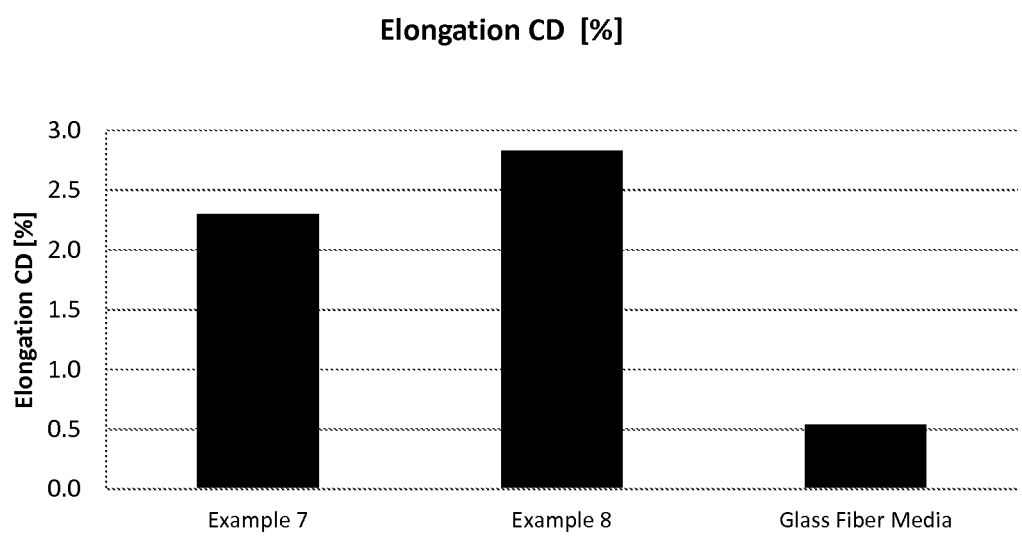
FIG. 4 illustrates tensile elongation measurements in the cross-machine direction for fiber web examples and a conventional glass fiber filter media.

FIG. 4 illustrates a comparison in the cross-machine direction tensile elongation between: a fiber web where 100% of the fibers are synthetic with lyocell comprising 21% by weight of the fibers and no bi-component fibers incorporated therein (Example 7); a fiber web where 100% of the fibers are synthetic with lyocell comprising 21% by weight of the fibers and with bi-component fibers comprising 4.5% by weight of the fibers (Example 8); and a fiber web where 100% of the fibers are glass fibers. Compared with a conventional glass fiber web, the cross-machine direction tensile elongation is greater for fiber webs that include lyocell, and is even greater for fiber webs that include both lyocell and bi-component fibers together.

Figure 5:
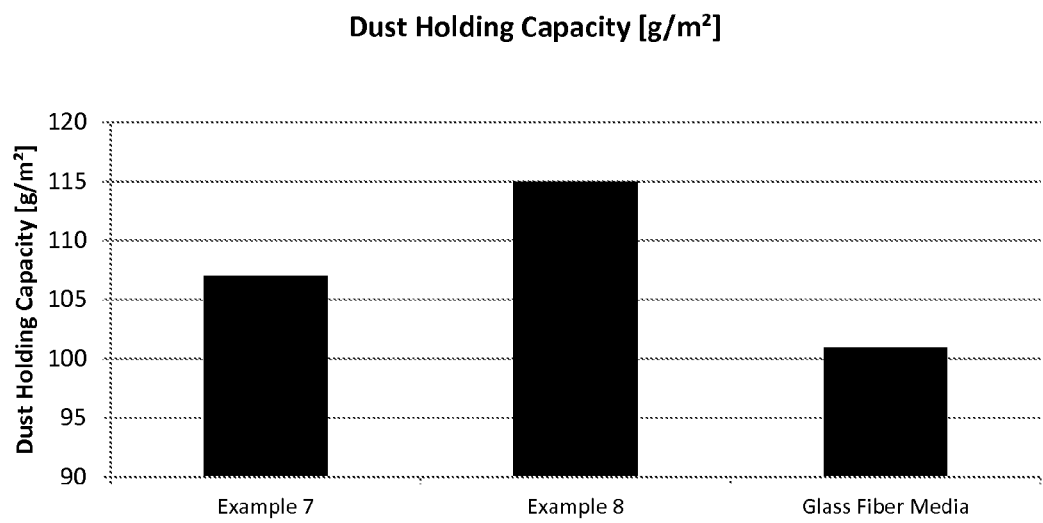
FIG. 5 illustrates dust holding capacity measurements for fiber web examples and a conventional glass fiber filter media.

FIG. 5 illustrates a comparison of dust holding capacity between Example 7, Example 8, and the conventional glass fiber web, as measured using the Multipass Filter Test described above. Compared with the conventional glass fiber web, the dust holding capacity is greater for fiber webs that include lyocell, and is even greater for fiber webs that include both lyocell and bi-component fibers together.

Figure 6:
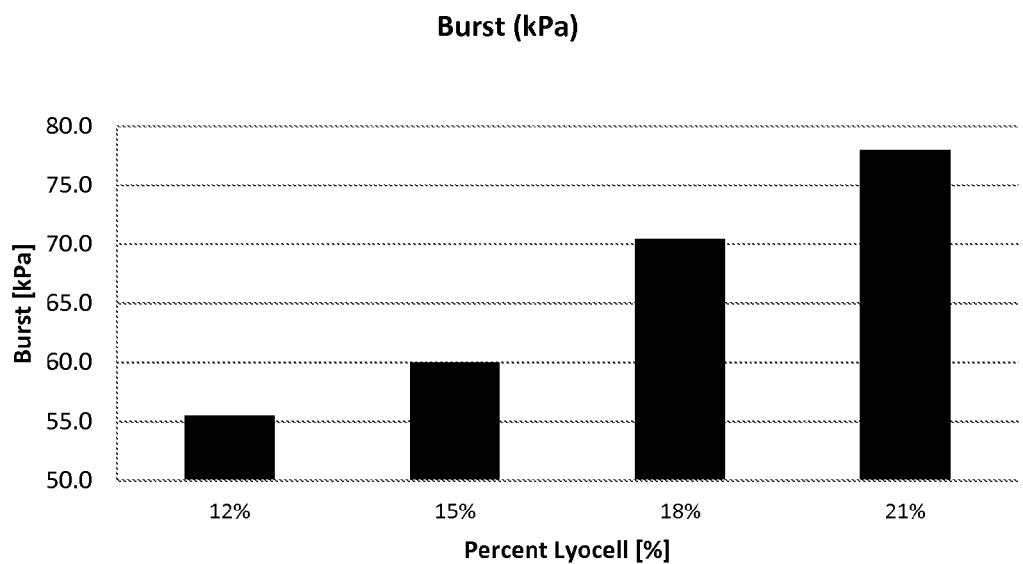
FIG. 6 depicts burst strength measurements for fiber web examples having lyocell of varying weight percentage.

It was further observed that fiber webs having increased amounts of lyocell exhibited relatively greater burst strength properties than fiber webs having lesser amounts of lyocell. FIG. 6 shows the trend in the data provided in Table 2 for the burst strength of fiber webs having increased amounts of lyocell incorporated therein. The average burst strength was measured for fiber webs each having a corresponding amount of lyocell percentage. Thus, the average burst strength was measured, respectively, for Examples 1 and 2 (fiber webs having a 12% amount of lyocell); Examples 3 and 4 (fiber webs having a 15% amount of lyocell); Examples 5 and 6 (fiber webs having a 18% amount of lyocell); and Examples 7 and 8 (fiber webs having a 21% amount of lyocell).

Figure 7:
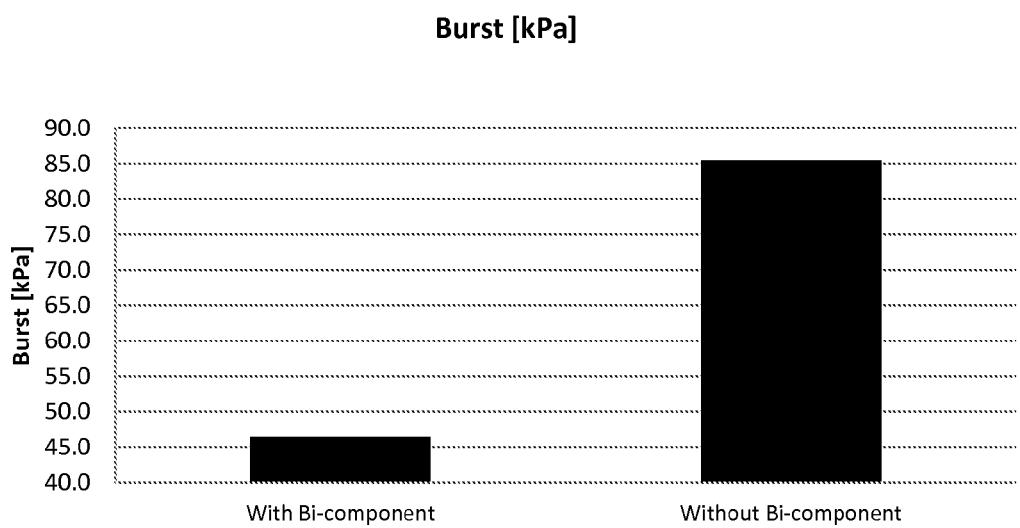
FIG. 7 depicts burst strength measurements for fiber web examples with and without bi-component fibers.

Fiber webs incorporating bi-component fibers were also observed to exhibit a greater burst strength than fiber webs that did not incorporated bi-component fibers. FIG. 7 depicts the difference in burst strength for fiber webs that incorporate bi-component fibers as compared with fiber webs that do not incorporate bi-component fibers. In this graph, the average burst strength was measured, respectively, for Examples 1, 3, 5 and 7 (fiber webs that do not include bi-component fiber); and Examples 2, 4, 6 and 8 (fiber webs that have a 4.5% amount of bi-component fiber incorporated therein).

Figure 8:
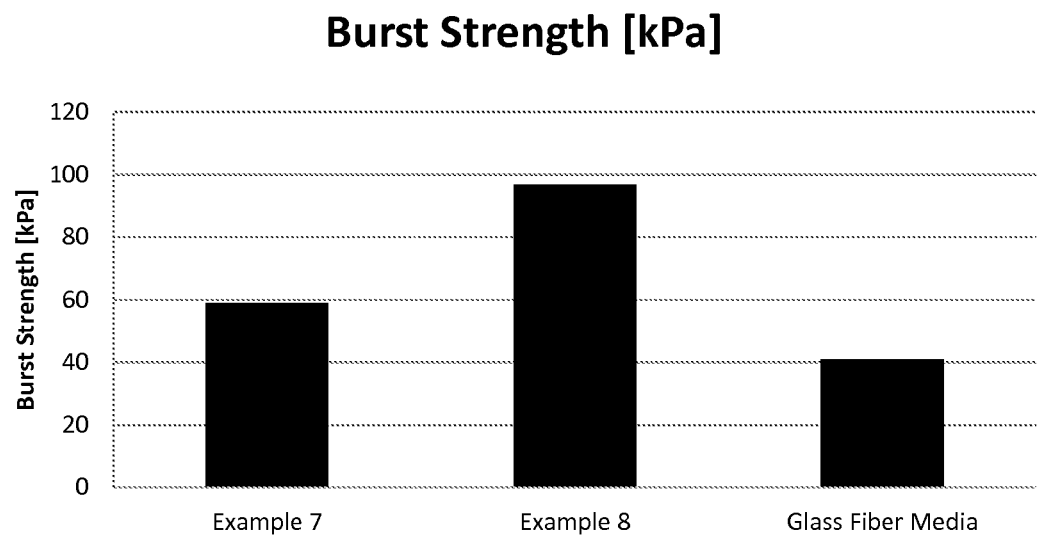
FIG. 8 illustrates burst strength measurements for fiber web examples and a conventional glass fiber filter media.

FIG. 8 illustrates a comparison of burst strength properties between Example 7, Example 9, and a conventional glass fiber web. Compared with the conventional glass fiber web, the burst strength is greater for fiber webs that include lyocell, and is even greater for fiber webs that include both lyocell and bi-component fibers.

Figure 9:
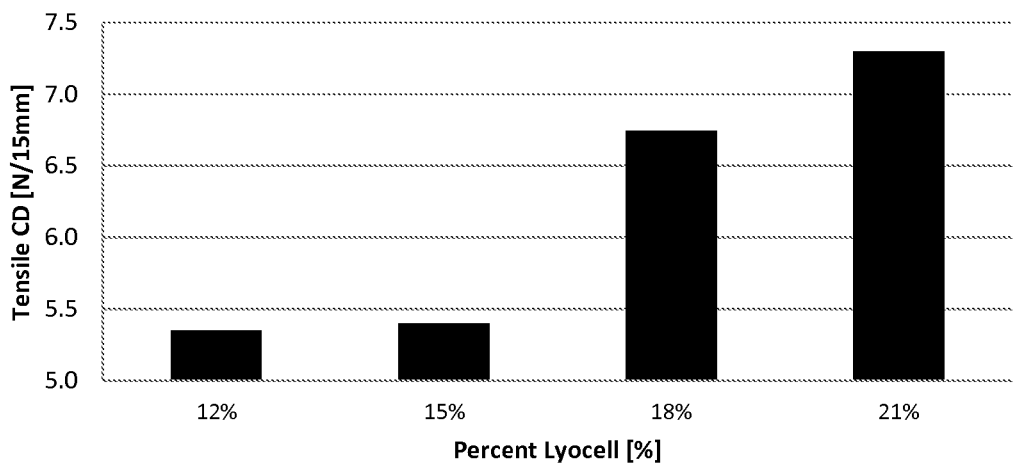
FIG. 9 depicts tensile strength measurements in the cross-machine direction for fiber web examples having lyocell of varying weight percentage.

Fiber webs having greater amounts of lyocell were observed to exhibit greater tensile strength in the cross-machine direction as compared to fiber webs having lesser amounts of lyocell. FIG. 9 depicts the trend in the data of Table 2 for the tensile strength of fiber webs in the cross-machine direction having increasing amounts of lyocell incorporated therein. The average tensile strength in the cross-machine direction was measured for fiber webs each having a corresponding amount of lyocell. Accordingly, the average cross-machine direction tensile strength was measured, respectively, for Examples 1 and 2 (fiber webs having a 12% amount of lyocell); Examples 3 and 4 (fiber webs having a 15% amount of lyocell); Examples 5 and 6 (fiber webs having a 18% amount of lyocell); and Examples 7 and 8 (fiber webs having a 21% amount of lyocell).

Figure 10:
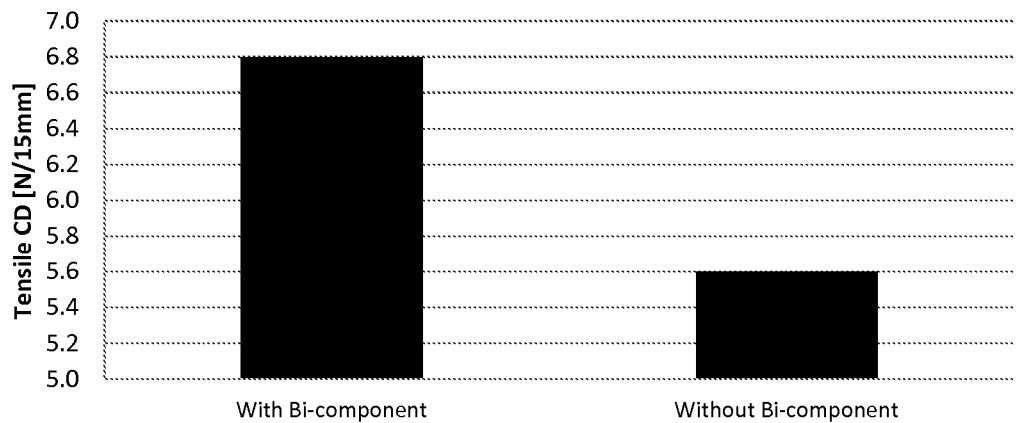
FIG. 10 depicts tensile strength measurements in the cross-machine direction for fiber web examples with and without bi-component fibers.

Fiber webs incorporating bi-component fibers were also observed to have a greater tensile strength in the cross-machine direction than fiber webs that did not incorporate bi-component fibers. FIG. 10 illustrates the difference in tensile strength in the cross-machine direction for fiber webs that incorporate bi-component fibers relative to fiber webs that do not incorporate bi-component fibers. In this graph, the average cross-machine direction tensile strength was measured, respectively, for Examples 1, 3, 5 and 7 (fiber webs that do not include bi-component fiber); and Examples 2, 4, 6 and 8 (fiber webs that have a 4.5% amount of bi-component fiber incorporated therein).

In addition to the Examples provided above, six different fiber web hand sheets were prepared where the lyocell fibers included within each of the fiber webs had a different level of fibrillation. The weight percentage of polyester fibers within the fiber webs was 80% of the fibers and the weight percentage of lyocell within the fiber webs was 20% of the fibers. The polyester fibers were the same PES 0.3 dtex and PES 0.6 dtex fibers used above for Examples 1-8 blended at a 50:50 ratio. No bi-component fibers were included in these six examples. Each of the handsheets had a basis weight of approximately 60 g/m$^2$.

Figure 11:
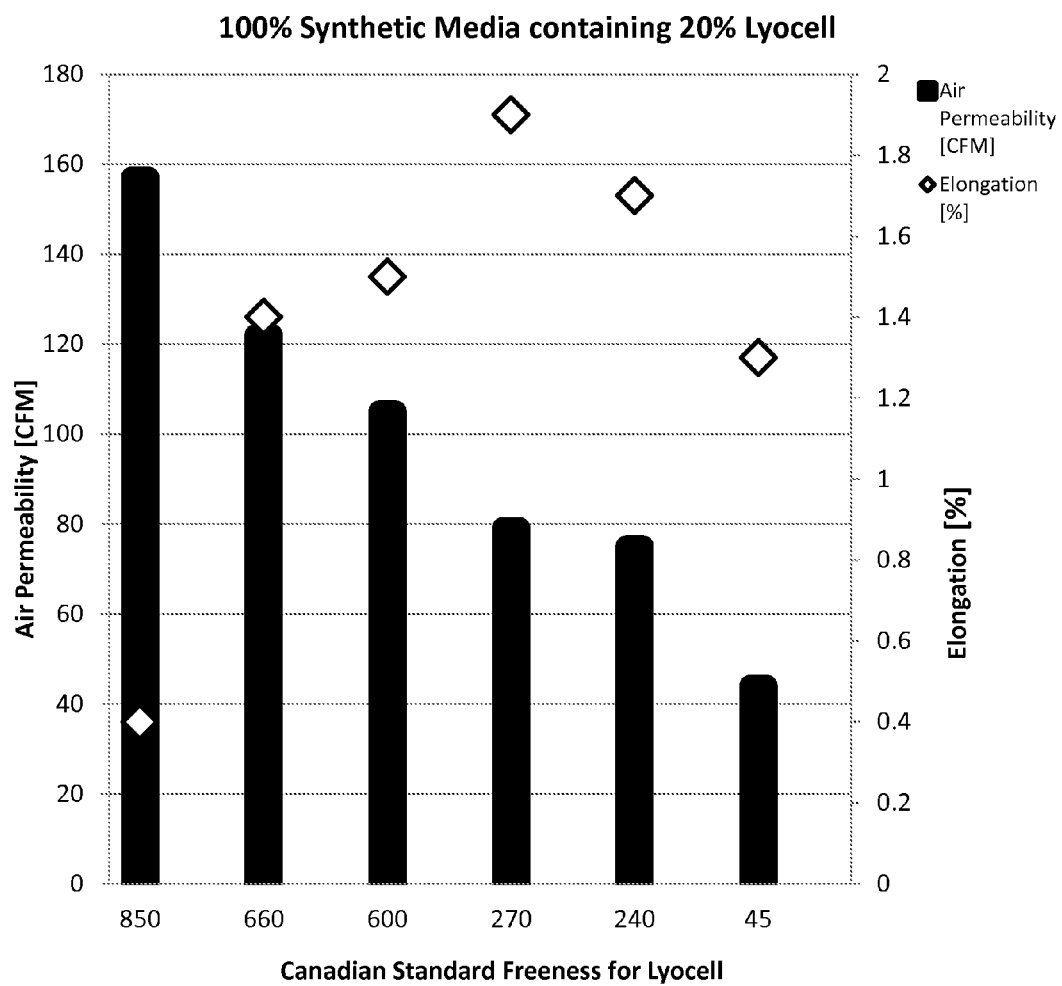
FIG. 11 shows air permeability and tensile elongation measurements for fiber web examples having varying levels of Canadian Standard Freeness.

FIG. 11 depicts a comparison of the air permeability and tensile elongation properties of fiber webs having varying levels of fibrillation. As shown, the air permeability of a fiber web decreases with increasing levels of fibrillation of the fibrillated fibers. That is, the air permeability was generally observed to be less for fiber webs having fibers that are increasingly fibrillated (e.g., having a CSF level of 45). Conversely, the air permeability was observed to be greater for fiber webs having fibers that are less fibrillated (e.g., having a CSF level of 850).

As shown in FIG. 11, the tensile elongation of the fiber web was observed to decrease when the fibers were not sufficiently fibrillated (e.g., having a CSF level of 600, 660, 850). However, the tensile elongation was also observed to decrease when the fibers were very fibrillated (e.g., having a CSF level of 45). Though, the fiber webs having CSF levels of 240 and 270 were observed to have greater measured tensile elongation properties than fiber webs having higher (e.g., 850) or lower (e.g., 45) CSF levels. Accordingly, a favorable balance between air permeability and tensile elongation was achieved by appropriate variation of the level of fibrillation of the fibers within the fiber webs.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A fiber web comprising a plurality of non-fibrillated synthetic fibers and a plurality of fibrillated fibers, wherein the non-fibrillated synthetic fibers comprises between about 30 weight % and about 95 weight % of the fiber web, and the fiber web has a dust holding capacity of greater than about 40 g/m$^2$ and a machine direction tensile strength of greater than about 3 N/15 mm.

2. The fiber web of claim 1, wherein the fiber web comprises a weight percentage of glass fibers of between 0% and about 5%.

3. The fiber web of claim 1, wherein the fiber web is substantially free of glass fibers.

4. The fiber web of claim 1, wherein the plurality of non-fibrillated synthetic fibers comprises a plurality of multi-component fibers.

5. The fiber web of claim 4, wherein the fiber web comprises between about 1 weight % and about 20 weight % multi-component fibers.

6. The fiber web of claim 5, wherein the fiber web comprises less than about 10 weight % multi-component fibers.

7. The fiber web of claim 6, wherein the fiber web comprises less than about 5 weight % multi-component fibers.

8. The fiber web of claim 1, wherein the fiber web comprises between about 5 weight % and about 60 weight % fibrillated fibers.

9. The fiber web of claim 1, wherein the plurality of fibrillated fibers have a Canadian Standard Freeness level of fibrillation of between about 50 mL and about 850 mL.

10. The fiber web of claim 9, wherein the plurality of fibrillated fibers have an average Canadian Standard Freeness level of fibrillation of between about 150 mL and about 600 mL.

11. The fiber web of claim 10, wherein the plurality of fibrillated fibers have an average Canadian Standard Freeness level of fibrillation of between about 200 mL and about 350 mL.

12. The fiber web of claim 1, wherein the plurality of the fibrillated fibers comprises a plurality of lyocell fibers.

13. The fiber web of claim 12, wherein the plurality of lyocell fibers have an average Canadian Standard Freeness level of fibrillation of between about 50 mL and about 850 mL.

14. The fiber web of claim 13, wherein the plurality of lyocell fibers have an average Canadian Standard Freeness level of fibrillation of between about 150 mL and about 600 mL.

15. The fiber web of claim 14, wherein the plurality of lyocell fibers have an average Canadian Standard Freeness level of fibrillation of between about 200 mL and about 350 mL.

16. The fiber web of claim 1, wherein the fiber web has a cross-machine direction tensile elongation of greater than about 0.2%.

17. The fiber web of claim 1, wherein the fiber web has a dry Schopper burst strength of greater than about 5 kPa.

18. The fiber web of claim 1, wherein the fiber web has a cross-machine direction tensile strength of greater than about 2 N/15.

19. The fiber web of claim 1, wherein the fiber web has a beta efficiency ratio of greater than or equal to about 200 for particles having an average diameter of greater than about 10 microns.

20. A filter element comprising the fiber web of claim 1.

21. A filter media comprising:
    a first layer having a first plurality of non-fibrillated synthetic fibers and a first plurality of fibrillated fibers, wherein the first plurality of non-fibrillated synthetic fibers comprises between about 30 weight % and about 95 weight % of the first layer; and
    a second layer having a second plurality of non-fibrillated synthetic fibers and a second plurality of fibrillated fibers, wherein the second plurality of non-fibrillated synthetic fibers comprises between about 30 weight % and about 95 weight % of the second layer;
    wherein the filter media has a dust holding capacity of greater than about 40 g/m$^2$ and a machine direction tensile strength of greater than about 3 N/15 mm.

22. The filter media of claim 21, wherein the average Canadian Standard Freeness level of fibrillation of the first plurality of fibrillated fibers is greater than the average Canadian Standard Freeness level of fibrillation of the second plurality of fibrillated fibers.

23. The filter media of claim 21, wherein the weight percentage of the second plurality of fibrillated fibers within the second layer is greater than the weight percentage of the first plurality of fibrillated fibers within the first layer.

24. A fiber web comprising a plurality of non-fibrillated synthetic fibers and a plurality of fibrillated fibers, wherein the plurality of fibrillated fibers have a Canadian Standard Freeness level of fibrillation of between about 50 mL and about 850 mL and the non-fibrillated synthetic fibers comprises between about 30 weight % and about 95 weight % of the fiber web, and the fiber web has a dust holding capacity of greater than about 40 g/m$^2$ and a machine direction tensile strength of greater than about 3 N/15 mm.

25. The fiber web of claim 24, wherein the plurality of non-fibrillated synthetic fibers comprises a plurality of multi-component fibers.

26. The fiber web of claim 25, wherein the fiber web comprises between about 1 weight % and about 20 weight % multi-component fibers.

27. The fiber web of claim 24, wherein the fiber web comprises a weight percentage of glass fibers of between 0% and about 5%.

* * * * *